(12) United States Patent
Verbakel et al.

(10) Patent No.: US 10,589,224 B2
(45) Date of Patent: Mar. 17, 2020

(54) GAS CAPTURE APPARATUS AND METHOD

(71) Applicant: KONINKLIJKE PHILIPS N.V., Eindhoven (NL)

(72) Inventors: Frank Verbakel, Eindhoven (NL); Rene Stallenberg, Eindhoven (NL); Cornelis Reinder Ronda, Eindhoven (NL); Jan Frederik Suijver, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 127 days.

(21) Appl. No.: 15/526,057

(22) PCT Filed: Nov. 10, 2015

(86) PCT No.: PCT/EP2015/076225
§ 371 (c)(1),
(2) Date: May 11, 2017

(87) PCT Pub. No.: WO2016/075148
PCT Pub. Date: May 19, 2016

(65) Prior Publication Data
US 2017/0326497 A1 Nov. 16, 2017

(30) Foreign Application Priority Data

Nov. 13, 2014 (WO) ................ PCT/CN2014/091055
Dec. 22, 2014 (EP) ..................................... 14199571

(51) Int. Cl.
*C25B 1/04* (2006.01)
*C25B 15/08* (2006.01)
(Continued)

(52) U.S. Cl.
CPC ............. *B01D 53/62* (2013.01); *B01D 53/78* (2013.01); *B01D 53/965* (2013.01);
(Continued)

(58) Field of Classification Search
CPC ...... B01D 53/62; B01D 53/78; B01D 53/965; B01D 2251/604; B01D 2257/302;
(Continued)

(56) References Cited

U.S. PATENT DOCUMENTS 3,692,649 A 9/1972 Prigent
2003/0059355 A1* 3/2003 Chen ........................ A01G 7/02
422/224

(Continued)

FOREIGN PATENT DOCUMENTS

FR 2998811 A1 6/2014
JP 2010125354 A 6/2010
(Continued)

OTHER PUBLICATIONS (http://www.lighting.philips.com/pwc_li/main/shared/assets/downloads/pdf/horticulture/leaflets/general-booklet-philips-led-lighting-in-horticulture-EU.pdf).
(Continued)

*Primary Examiner* — Ciel P Thomas

(57) ABSTRACT

A capture device for capturing a target gas from a gas flow is disclosed that can be continuously used without requiring consumption of target gas binding salts. To this end, the device is arranged to generate separate acidic and alkaline streams of fluid by electrolyzing water, binding the target gas to the hydroxide ions in the alkaline fluid stream or the hydronium ions in the acidic stream, and recombining the generated streams to release the bound target gas and regenerating part of the electrolyzed water for further electrolysis. Such a capture device may for instance be used in a gas purification system, e.g. an air purification system for controlling target gas levels in a confined space such as a vehicle cabin, domestic dwelling or office space, a target gas generation system or a target gas enrichment system, e.g. for creating target gas-rich air for horticultural purposes. A (Continued)

method for capturing target gas from a gas flow and optionally utilizing the captured target gas is also disclosed.

25 Claims, 14 Drawing Sheets

(51) Int. Cl.
*C02F 1/461* (2006.01)
*B01D 53/62* (2006.01)
*B01D 53/96* (2006.01)
*B01D 53/78* (2006.01)

(52) U.S. Cl.
CPC .............. *C02F 1/4618* (2013.01); *C25B 1/04* (2013.01); *C25B 15/08* (2013.01); *B01D 2251/604* (2013.01); *B01D 2257/302* (2013.01); *B01D 2257/404* (2013.01); *B01D 2257/504* (2013.01); *B01D 2258/0283* (2013.01); *B01D 2258/06* (2013.01); *B01D 2259/4566* (2013.01); *B01D 2259/4575* (2013.01); *C02F 2201/46125* (2013.01); *C02F 2201/46145* (2013.01); *C02F 2201/46185* (2013.01); *C02F 2209/07* (2013.01); *Y02C 10/04* (2013.01); *Y02E 60/366* (2013.01); *Y02P 20/152* (2015.11); *Y02W 10/33* (2015.05); *Y02W 10/37* (2015.05)

(58) Field of Classification Search
CPC ........ B01D 2257/404; B01D 2257/504; B01D 2258/0283; B01D 2258/06; B01D 2259/4566; B01D 2259/4575; C02F 1/4618; C02F 2201/46125; C02F 2201/46145; C02F 2201/46185; C02F 2209/07; C25B 1/04; C25B 15/08; Y02W 10/33; Y02W 10/37; Y02P 20/152; Y02C 10/04; Y02E 60/366
See application file for complete search history.

(56) References Cited

U.S. PATENT DOCUMENTS

| | | |
|---|---|---|
| 2006/0051274 A1 | 3/2006 | Wright |
| 2008/0248350 A1 | 10/2008 | Little |
| 2009/0127127 A1 | 5/2009 | Jones |
| 2010/0084283 A1 | 4/2010 | Gomez |
| 2011/0083968 A1 | 4/2011 | Gilliam |
| 2011/0108421 A1 | 5/2011 | Lackner |
| 2012/0121731 A1* | 5/2012 | Peters .................. C02F 1/4674 424/722 |
| 2013/0200625 A1* | 8/2013 | Wei ...................... B01D 53/22 290/52 |
| 2014/0217017 A1* | 8/2014 | Fry ....................... C02F 3/322 210/611 |

FOREIGN PATENT DOCUMENTS

| | | |
|---|---|---|
| WO | 2006/036396 | 4/2006 |
| WO | 2008/042919 | 4/2008 |
| WO | 2008115662 A2 | 9/2008 |
| WO | 2011088515 A1 | 7/2011 |

OTHER PUBLICATIONS http://afrsweb.usda.gov/SP2UserFiles/Place/64200500/csr/ResearchPubs/rogers/rogers_93b.pdf.
Elly Nederhoff, "Carbon dioxide enrichment, Practical Hydroponics & Greenhouses", May/Jun. 2004, pp. 50-59.
Heejung Jung, "SAE International: Modeling CO2 Concentrations in Vehicle Cabin", 2013-01-1497.
http://wardsauto.com/vehicles-amp-technology/hyundai-genesis-offer-world-s-first-interior-co2-monitor.
http://ehp.niehs.nih.gov/ehbasel13/p-2-08-13/.

* cited by examiner

GAS CAPTURE APPARATUS AND METHOD

This application is the U.S. National Phase application under 35 U.S.C. § 371 of International Application No. PCT/EP2015/076225, filed on Nov. 10, 2015, which claims the benefit of International Application No. PCT/CN2014/091055 filed on Nov. 13, 2014 and International Application No. 14199571.2 filed on Dec. 22, 2014. These applications are hereby incorporated by reference herein.

FIELD OF THE INVENTION

The invention relates to a method and apparatus for target gas capture from a substrate and to systems including the apparatus and one confined space. The invention further relates to a computer programmed product for controlling the apparatus or for performing the steps of the method

BACKGROUND OF THE INVENTION

Carbon dioxide ($CO_2$) is a greenhouse and asphyxiant gas that is considered at least in part responsible for climate change effects such as global warming due to the increasing levels of $CO_2$ in the earth's atmosphere. In addition, elevated $CO_2$ levels are considered a health hazard when humans are exposed to such elevated levels, as such elevated levels of $CO_2$ can cause several symptoms of unwellness including muscle stiffness, drowsiness, head ache, impaired vision, unconsciousness or even death depending on the level and duration of exposure. For instance, whereas atmospheric levels of $CO_2$ are around 350-450 ppm, complaints of stiffness have been documented at increased levels in the range of 600-1,000 ppm and general drowsiness symptoms documented at increased levels in the range of 1,000-2,500 ppm. An increased risk of more severe adverse health effects is expected to occur at increased levels in the range of 2,500-5,000 ppm or above. These are increased ranges that may be encountered during normal daily life. More rarely, further elevated $CO_2$ levels may be encountered, which may cause intoxication, breathing difficulties and palpitations for $CO_2$ levels up to 30,000 ppm, in addition to which headaches and sight impairment may occur for $CO_2$ levels up to 50,000 ppm, with unconsciousness resulting in death under prolonged exposure at risk of occurring for $CO_2$ levels up to 100,000 ppm.

For at least these reasons, efforts have been made to remove $CO_2$ from gas streams, e.g. industrial flue streams, air streams, e.g. to reduce the emission of greenhouse gases or to control the levels of $CO_2$ in an occupied space such as an office space or a domestic dwelling. A variety of different solutions are available, ranging from absorbing materials, e.g. filters, to $CO_2$ capturing devices. Such capturing devices may employ chemical entities to which the $CO_2$ can be reversibly bound, such as amines, amidines or inorganic salts.

An example of an electrolyis-based industrial process is given by WO 2011/088515 A1, in which seawater is distilled to produce a concentrated brine solution. The concentrated brine solution is subsequently electrolysed to produce hydrogen and chlorine gas as well as a sodium hydroxide solution. The hydrogen and chlorine gas are subsequently applied to a volume of water to generate aqueous hydrochloric acid and sodium hydroxide solution is exposed to flue gases contaminated with $CO_2$ in order to capture the $CO_2$ from these flue gases. The aqueous hydrochloric acid stream and the sodium hydroxide solution stream including the captured $CO_2$ are subsequently recombined to release the $CO_2$ in a controlled manner and regenerate the original constituent gases. However, a problem with such a brine-based process is that it is ill-suited for use in small-scale application domains such as domestic or office spaces due to the generation of chlorine gas in the process, which is highly toxic to humans. Even if an apparatus is provided in which the chlorine gas is generated and managed in a well-controlled manner, accidental damage to the apparatus causing the unwanted release of chlorine gas due to the disruption of such control measures may be difficult to avoid.

US 2008/0248350 A1 discloses a $CO_2$-negative process of manufacturing renewable $H_2$ and trapping $CO_2$ from air or gas streams. Direct current renewable electricity is provided to a water electrolysis apparatus with sufficient voltage to generate hydrogen and hydroxide ions at the cathode, and hydronium ions (($H_3O$)) and oxygen at the anode. These products are separated and sequestered and the base is used to trap carbon dioxide from the air or gas streams as bicarbonate or carbonate salts. These carbonate salts, hydrogen, and trapped carbon dioxide in turn can be combined in a variety of chemical and electrochemical processes to create carbon-based materials made from atmospheric carbon dioxide. However, a characteristic of such a process is that it also relies on the presence, continuous supply and consumption of suitable cations for the formation of the bicarbonate and carbonate salts, and it is difficult to run the process in a continuous mode. The need for continuous supply of suitable cations also makes the process less suitable for the aforementioned small-scale applications, which ideally should operate as a closed system requiring minimal user intervention.

SUMMARY OF THE INVENTION

It is an object of the invention to at last partially resolve the issues indicated above.

The object is reached with the method and apparatus of the invention. The invention is defined by the independent claims. The dependent claims provide advantageous embodiments. It is noted that all dependent claims can be combined with all the respective independent claims, unless it is indicated specifically that such is not possible for technical reasons.

The invention provides an apparatus and method for capturing a target gas that in at least some embodiments may be used to extract a target gas from a confined space in which people may be present. This therefore requires an apparatus and method that facilitates such target gas capture without (regular) user intervention and without the risk of emissions of byproducts that are potentially harmful or toxic to the people in the confined space.

The invention is based on the insight that small scale electrolysis of water to form separate streams of a capture fluid and a recombination fluid facilitates the capturing of target gases from a confined space using the capture fluid stream without the need for brine to be used. The recombination of the exchange fluid obtained from the capture fluid through the electrolysis of an electrolyte and after binding a target gas, with the recombination fluid also obtained from the electrolysis, where the capture fluid and the recombination fluid are either basic and acidic, respectively, or vice versa, causes the release of the target gas from the mixture and results in a regeneration fluid in which the electrolyzed water is recombined and optionally wherein at least some of the additional electrolyte salts and/or any electrolysed species that caused the acidity and basicity in the capture and recombination fluids are regenerated. The regeneration fluid thus may more closely or may even completely resemble the original electrolyte and may thus be used again in the generation device for generation of the capture fluid and recombination fluid, thereby providing a closed-loop target gas capturing approach adapted to be used on a relatively small scale, e.g. in confined spaces having a volume of 2-20,000 m$^3$ or similar volumes.

In order for such an apparatus and method to be used effectively on such small scales, it is imperative that excessive recombination of the hydronium and hydroxide ions generated at the respective electrodes during water electrolysis is avoided. To this end, the half reactions are performed at respective electrodes in separate compartments that are in ionic communication with each other through an ion communication structure between the compartments that is substantially impermeable to hydronium ions and hydroxide ions, e.g. an ion-selective membrane or a salt bridge.

With the invention, the target gas is released and can be used for several purposes as will be described herein below. The invention has numerous advantages related to such use and control for such use, as will also be described herein below.

The invention allows the apparatus and method to be used in or as a continuous process. More specifically, the apparatus is designed to allow a continuous flow of fluids, thereby facilitating a continuous mode of displacing target gas from the capturing location, preferably but not necessarily a confined space, to a location remote from the capturing location without the need to extract target gas-containing salts from the exchange fluid. The transport can be in captured form, but also in released form after capture. This invention thus enables continuous climate control with respect to target gas in several different environments such as horticulture, factory space or, living space or transportation spaces.

The container of the generation device may comprise a first compartment comprising the first electrode and a second compartment comprising the second electrode. The first compartment may comprise the capture fluid outlet and the second compartment may comprise the recombination fluid outlet. The compartments can be parts of one and the same container, e.g. a container for holding the electrolyte to be electrolyzed. The compartments are in ionic communication with each other through an ion communication structure that substantially reduces flow of hydronium and hydroxide ions between the two compartments. Alternatively the container may be made up of separated sub-containers one comprising the first compartment and the other comprising the second compartment. The sub-containers are configured such that flow of ions is enabled between the first compartment and the second compartment through the aforementioned ion communication structure. Such flow of ions for instance may be enabled through a salt bridge as known in electrochemistry and connecting the sub-containers and/or the first and second compartments. In another alternative the sub-containers are configured to each provide a stand-alone electrolysis cell with another electrode for independent electrolysis. This enables generation of capture and recombination fluids with different types of electrolytes.

The electrolysis device can have a reference electrode as known in electrochemistry. If the electrolyte comprises water as the main solvent this reference electrode can be standard calomel or even platinum hydrogen electrode.

In order to facilitate the closed loop operation of the apparatus, the apparatus comprises a regeneration fluid inlet fluidically connected to the generation device, and a regeneration fluid outlet fluidically connected to the regeneration device and fluidically connected to the regeneration fluid inlet. This provides a stand-alone operating apparatus.

The apparatus further comprises a controller electrically coupled to the first electrode and the second electrode, wherein the controller is adapted to generate a control signal having a minimum value sufficient to generate the water electrolysis at the first electrode and the second electrode respectively and being variable to control the rate of said water electrolysis at the first electrode and the second electrode respectively. In this manner, and apparatus is provided that can be operated using operating parameters such as fluid flow and fluid pH that are tailored to external conditions, e.g. varying concentrations of a target gas to be extracted from a confined space. This makes the apparatus particularly suitable for small-scale applications as the apparatus can control how much of the target gas is extracted from the substrate it is provided with, e.g. a gaseous input flow. In other words, the apparatus is capable of controlling how much of a target gas remains in the substrate, which for instance is particularly important when trying to ensure that concentrations of the target gas such as $CO_2$ remain within optimal limits from a health perspective to people exposed to the target gas within a confined space for instance, or remain within optimal limits from a process control perspective, for instance when controlling levels of the target gas in a horticultural setup. It is noted that this clearly distinguishes the apparatus from industrial-scale setups where there is typically no desire to maintain a residual level of target gas in an outflow (e.g. expelled flue gases) as the objective of such industrial-scale setups is to maximize removal of such target gases.

In an embodiment, the apparatus is configured to generate a flow of the capture fluid and/or the recombination fluid from 1 liter to 10,000 liter per hour, preferably from 10 liter to 1,000 liter per hour. It has been found that such flow rates render the apparatus particularly suitable for small-scale application domains, although it should be understood that the flow rate of these fluids may not be the only relevant parameter to be controlled by the controller of the apparatus; such a parameter for instance may be controlled in combination with the pH of the respective fluids generated by the apparatus and/or may be controlled in response to sensor readings indicative of for instance the levels of target gas to be extracted from the substrate, e.g. a volume of air within a confined space.

The exchange device of the apparatus can have a substrate inlet for providing the substrate to the exchange device. It can also have a substrate outlet for letting out substrate that has been at least partly in contact with the capture fluid. The substrate inlet and outlet can be a gas inlet and gas outlet, respectively. The exchange device can use a counter flow principle for increasing the amount of target gas capture or release. For instance, the exchange device may be a contra-flow cell arranged to feed the substrate flow, e.g. a gas flow through the capture fluid in a flow direction opposite to the flow direction of the capture fluid, i.e. the inlet of the substrate flow is opposite to the inlet of the capture fluid. To this end the exchange device comprises a substrate inlet at a first end for receiving a substrate flow and a substrate outlet at a second end for releasing a purified flow of substrate.

The apparatus may comprise one or more pumps and/or valves to directly and/or indirectly control a flow rate of one or more of: the capture fluid, the recombination fluid, the exchange fluid, the regeneration fluid and the substrate. Preferably, the one or more pumps and/or valves are controlled by the controller. The flow control can be direct or indirect. In the direct flow control, the valve or pump is in direct contact with the flow that it controls, while in indirect control, the flow is controlled through control of another flow and transfer of such flow to the other flow e.g. by hydrostatics (pressure). This indirect control may comprise the use of closed fluidic connections for pressure maintenance throughout the fluid flow canals of the apparatus.

The control of flow of one or more of the fluids in the apparatus gives control over the target gas capture capacity of the apparatus as described in more detail in the detailed description section.

A preferred apparatus may comprise either a pump and/or valve to directly control the rate of flow of the capture fluid and to directly control the rate of flow of the recombination fluid; or a pump and/or valve to directly control the rate of flow of the regeneration fluid A preferred apparatus comprises one pump and/or valve for flow control of the capture fluid and one pump and/or valve for flow control of the recombination fluid. The capture fluid control pump can for example be located between the generation device and the exchange device, while the recombination fluid control pump can be located between the generation device and the regeneration device. This setup enables independent control of the complementary (to be recombined) fluid flows in the device. Hence, pH control of the regeneration fluid can be performed.

Alternatively, there may be one or more pumps for flow control of the regeneration fluid only. As this regeneration fluid outflow of the regeneration device will dictate the inflow of exchange fluid and recombination fluid flow together, the one pump may be enough to govern the flow control of the device. As a further improved embodiment of this, there may be controllable valves in either one of or both of the recombination fluid flow and the capture fluid flow or exchange fluid flow. With these, fluid flow or flow rate can be independently regulated while having only one pump. The pump or valve in the regeneration fluid flow has the advantage that it is less susceptible to chemical wear due to the softer chemical conditions compared to any of the other fluid flows (more acidic or basic). Cheaper or other pumps or valves can be employed.

The exchange device and/or the regeneration device can comprise an agitation device for active stimulation of the exposure in the exchange device and/or the contacting in the regeneration device. Preferably, the agitation device is controlled by the controller. Active agitation thus can increase efficiency of target gas capture from the substrate and/or of release of the target gas from the exchange fluid. It may also provide a way to control the target gas capture and release efficiency of the apparatus as described herein below.

The apparatus can comprise at least one sensor for sensing one or more of the following sensing parameters: acidity of any one of: the one or more electrolytes, the capture fluid, the recombination fluid, the exchange fluid and the regeneration fluid; flow rate of any one of: the one or more electrolytes, the capture fluid, the recombination fluid, the exchange fluid and the regeneration fluid and the substrate; and presence or concentration of the target gas in the substrate before contacting with the capture fluid and/or of the target gas in the part of the substrate that has been in contact with the capture fluid. Preferably, the controller is responsive to the at least one sensor.

Preferably, the apparatus comprises at least one target gas sensor for sensing the concentration or content of the target gas in the substrate before entering the apparatus. The sensor can be remotely placed in a space having the substrate therein or be located near a substrate inlet of the apparatus. This sensor can be used to provide feedback for control of the apparatus to provide control over the target gas level sensed. Preferably the apparatus also has a target gas sensor at a substrate outlet. The difference of target gas content measured by input sensor and output sensor indicates the capacity of target gas capture. The sensor readout or signals provide indications of the settings of the apparatus with respect to target gas capture capacity or power of the apparatus. Based on such sensor readouts or signals, apparatus control parameter settings can be changed either manually or automatically as described hereinafter.

A preferred apparatus may comprise:

either a sensor for sensing the rate of flow of the capture fluid and/or a sensor for sensing the rate of flow of the recombination fluid; or a sensor for sensing the rate of flow of the regeneration fluid; and either a sensor for sensing the presence or concentration of the target gas in the substrate before contacting with the capture fluid a sensor for sensing concentration, or a sensor for sensing the pH of the capture fluid, optionally completed with a sensor for sensing the pH of the recombination fluid.

With these sensor configurations good feedback can be obtained on the target gas capture capacity of the apparatus, which feedback may be used by the controller to adapt the operation of the apparatus in order to maintain levels of a target gas within an acceptable range, e.g within a confined space.

The apparatus can thus comprise a controller for controlling one or more of the following control parameters: the voltage and/or current provided to the electrodes for the electrolysis; the mechanical configuration of the electrodes for the electrolysis; the operation of the one or more valves and/or pumps as defined herein above; and the operation of the one or more agitation devices as defined herein above. Thus the controller preferably is adapted to at least regulate the rate of electrolysis and the flow rate of the capture fluid through the exchange device and optionally the flow rate of the substrate flow through the exchange device.

Preferably the controller is configured to control the voltage and/or current provided to the electrodes for the electrolysis and the operation of the one or more valves and/or pumps as defined herein above.

The apparatus can further comprise a target gas sensor and the controller coupled to the electrodes for electrolysis, said controller being responsive to said target gas sensor. Such a system may for instance be used to control the target gas levels in a confined space by sensing the target gas levels with the sensor and operating the apparatus in accordance with the sensed target gas levels (concentrations), thereby providing a system capable of maintaining the target gas levels in such a confined space at desired, e.g. healthy, or required levels. The target gas levels for instance may be controlled by regulating at least one of the control parameters as described herein above.

The controller of the apparatus is preferably configured for receiving the one or more signals of one or more sensors for sensing the one or more of the sensing parameters as defined herein above. Preferably the controller is for controlling the control parameters as defined above (in any combination) and for receiving the sensor signals of the sensors as defined herein before (in any combination).

Preferably the controller can be configured to allow automatically adjustment of controlling parameters based on one or more of the received sensor signals. This apparatus allows automated adjustment/stabilisation over time to maintain predetermined settings of target gas levels in substrate or target gas capture capacity of the apparatus.

The controller can include or be connected to a user interface in any form such as software (see below) or other. The user interface allowing a user to inspect sensor values or apparatus parameters derived therefrom, and/or to set controlling parameters or apparatus parameters derived therefrom. Apparatus parameters can be for example: apparatus target gas capture capacity or power, target gas delivery capacity or power, or even target gas levels to be maintained in confined spaces.

The apparatus can thus be, or be used as, an apparatus for control of a climate in a confined space with respect to level of target gas. There may be spaces that require addition of target gas, because of consumption through other causes or that require extraction of target gas, because of continuous production of target gas.

The apparatus can be, or be used as, a target gas generation apparatus. A suitable apparatus is then one as claimed in any of the previous claims, which comprises a target gas outlet for outflow of any captured target gas released from the exchange fluid as a consequence of the contacting in the regeneration device, where the target gas outlet can be coupled to a target gas storage tank. This apparatus can provide intermediate storage of target gas or batchwise production of target gas. Such apparatus facilitates the reuse of the target gas at a desired point in time and location, e.g. to produce value added products using the target as reagent or to enrich a further gas flow with target gas e.g. for other consumptive use. The tank can be removeably coupled. Advantages are provided also in the support of the method claims herein below. There may be a pressurising system between the target gas outlet and the storage tank to accommodate storage under increased pressure, i.e. higher than atmospheric pressure.

The tank can be coupled while there is also a target gas outlet for other purposes such as release in a further vessel or compartment carrying another gas.

The apparatus can be or be used as a gas enrichment system. The enrichment system being adapted to enrich a further gas flow with the target gas released from the apparatus. Such a system may be advantageously used for e.g. plant growth such as horticulture to enrich a growing environment with carbondioxide, or other gas thereby stimulating the growth of the plants in the growing environment. The target gas enrichment system may be adapted to feed the further gas flow through the regeneration device. This obviates the need for an additional stage in the system, thereby reducing its complexity. The enrichment system may further make use of a target gas storage tank as described and defined hereinabove but locate in between the gas outlet and a further gas flow compartment for enriching the further gas flow with the target gas. This facilitates periodic enrichment of the further gas flow, e.g. a further air flow, with the target gas at desired points in time.

The apparatus can also be or be used as a substrate purification system. It may thus be used for purifying a substrate by capturing a target gas from such substrate. Thus the apparatus can be used for purifying a substrate (e.g. gaseous atmosphere such as air) in a confined space with respect to target gas. The confined space can be part (room) of a building such as e.g. a factory, office, home, animal stables and others. The confined space can also be part (cabin) of any transportation device such as a ship, airplane or vehicle. The apparatus is then used to capture the gas from a substrate in such confined space and expel it into another space. This may keep target gas levels at required levels if the target gas is continuously generated. One example may be carbondioxide generated by living beings such as humans or animals. Too high levels can cause the adverse effects described in the background of the invention section. Conversely the control of carbondioxide levels in transportation device cabins may improve captain, pilot, or driver alertness and thus traffic safety.

The invention also provides a system comprising an apparatus as claimed in any of the previous claims and further including a target gas outlet and a confined space, wherein the substrate inlet is fluidically connected to the confined space and the target gas outlet is fluidically connected to at least another space different from the confined space. The confined space can then be part (room) of a building such as e.g. a factory, office, home, animal stables and others. The confined space can also be part (cabin) of any transportation device such as a ship, airplane or vehicle.

Alternatively, there is provided the system comprising an apparatus as claimed in any of the previous claims and further including a target gas outlet and a confined space, wherein the target gas outlet is fluidically connected to the confined space and the substrate inlet is fluidically connected to at least another space different from the confined space. The confined space can be part (room) of a building such as e.g. a factory, greenhouse or horticulture.

If the target gas is carbon dioxide, this system is advantageous for any process that requires increased carbon dioxide concentration in an atmosphere such as for example for the growth of plants in the growing environment.

The invention also provides a method for capturing a target gas from a substrate. The method has at least the advantages as described for the apparatus herein above.

The method comprises that with the contacting step a regeneration fluid is generated, the method further comprising the further step of repeating said generation step at least in part with the regeneration fluid.

The method comprises that the electrolyte comprises $H_2O$, preferably in the form of water and the generation comprises electrolysis of at least part of the $H_2O$ (water) for the generation of the capture fluid and/or the recombination fluid, and wherein the electrolyte comprises one or more additional substances each at least have one or more of the following functions: depression of the freezing point of the electrolyte, and/or the capture fluid and/or the recombination fluid; and increase of the electrical conductance of the electrolyte. These additional substances are electrolytically inert, i.e. do not decompose into potentially harmful substances at the electrodes at which the electrolysis half reactions are performed.

The method of the invention can comprise that the one or more additional substances consist of, or comprise at least one salt. The total concentration of the at least one salt in a liquid electrolyte preferably is between 1 mM to 15M. It may be >5 mM, >10 mM, >100 mM, >0.5M, >1M, >2, >3 M, >5M, >7M, >10M. Saturation concentrations of the salts in the solvents of the electrolyte can be used. The choice of salt can depend on the solvent of the electrolyte, as not all salts will dissolve in all solvents. Furthermore, the salt preferably is chosen such that any compounds resulting after capture of a target gas are still soluble in the exchange fluid. Preferably the at least one salt can be chosen from the group comprising or consisting of periodic element table group IA, IIA, IB and IIB ions and hologenide, sulphate, nitrate or phosphate ions. Preferred are the alkali metals salts such as e.g in particular lithium, sodium and potassium salts. Preferably the sulfates and nitrates are used. This group includes for example $LiNO_3$, $Li_2SO_4$, $NaNO_3$, $Na_2SO_4$, $KNO_3$, $K_2SO_4$, etc. Zn and Ag salts (e.g. $ZnSO_4$, $AgNO_3$), will also work. The Lithium salts may have higher solubility in electrolytes having other solvents than water.

Preferably the additional substances thus do not comprise or consist of any salt chosen from the group of fluorides, chlorides and Bromides.

The method can comprise that either the substrate is collected from a confined space and the captured target gas is released into another space that is different from the confined space, or the substrate is captured from another space and the captured target gas is released into a confined space that is different from the another space. In this way, the target gas can be either removed from the confined space or can be provided to the confined space. In other words, the target gas level can be regulated in the confined space. The former choice may be used for climate control in which the level of one or more target gases needs to be removed from a confined space, while the latter choice can be used for climate control in which a target gas needs to be administered to the confined space. The another space can be a further confined space. While the confined space can be a space where target gas is available in abundance and needs to be extracted, the further confined space can be a space where there is a need for the target gas. The confined space can thus be a living space of people or animals while the further confined space can be green house or space for growing plants. This setup can provide transport of the target gas in captured form.

The method may thus be a substrate purification system such as e.g. an air purification system for an improved control over the target gas levels in the confined space, e.g. a transportation device (airplane ship, vehicle), factory space, office space, stable or domestic dwelling, and so on. This may ensure that the people or animals within this confined space are not exposed to too high or potentially hazardous levels of target gas. Carbon dioxide may be such target gas. The another space may be an open space, e.g. an outdoor space such as the open air.

Alternatively, the confined space may be a space where increased levels of target gas are needed, requiring release of the captured target gas into the confined space. This method has the advantage that the atmosphere within the confined space may be enriched with the target gas. For example the confined space may be a greenhouse where carbondioxide levels need to be regulated or increased for regulation or stimulation of plant growth.

The method for regulating target gas level of a confined space may further comprise releasing the target gas from the exchange fluid into a further gas flow and releasing the further gas flow into the confined space or the further space. The further gas flow may for instance be an air flow within the confined space. This variant can provide transport of the captured gas in another gas flow form one space to another if the another space is a further confined space.

The method may further comprise temporarily storing the target gas after release from the exchange fluid and prior to releasing it in the confined space or the another space. This for instance facilitates the use of the target gas as a starting material in a synthesis of a value added product, e.g. a carbon-based fuel such as methanol, or the periodic release of the target gas into the aforementioned confined space, e.g. to stimulate or regulate a plant growth process within the second confined space using target gas bottles.

Preferably the target gas is carbon dioxide as then the are e.g. useful when the target gas is carbondioxide in air as the substrate.

The invention provides a computer program product comprising computer code stored on a computer readable medium or downloadable from a communications network, which code, when run on a computer, controls the apparatus and/or the controller of the apparatus and/or controls the performance of the steps of any one of the methods of the invention.

Automation of any of the apparatus parts to control the apparatus to perform the steps of the method of the invention can be implemented using computer programs. These can be in stored on computer readable medium such as e.g.: internal and external microprocessor memory of the types: RAM, ROM, FLASH, SD, magnetic disc or optical disk or other, or can be downloaded from communications networks such as LAN, WLAN, 3G, 4G, or other through wired connection or wireless connection using standard protocols of wifi or nearfield or other.

The computer program can include an interface for allowing input or setting of parameters for control of all control parameters described herein before or hereinafter such as for example the target gas levels to maintain a in confined space, the rate of target gas capture, the type of target gas capture, the pH level in one or more fluids in the apparatus, or the one or more flow rates of the fluids in the apparatus or method. The computer program can be partially or entirely in the form of an app on a portable device (see below).

The microprocessor can be a standard semiconductor IC-based computer. It may be a dedicated to the apparatus computer or be a portable device such as a smartphone tablet or the like carrying at least part of the computer program product. This allows remote and possibly wireless control of the apparatus.

Preferably the invention is for capturing any one of the following gases: carbon dioxide ($CO_2$), $SO_x$ and $NO_x$. The substrate is then preferably our atmosphere such as air. These target gases are abundant in our atmosphere and often need to be removed (climate control to prevent adverse effects of their presence in too high concentrations) or need to be added (stimulation of growth of plants in case of carbondioxide). In these cases the capture fluid is basic and the recombination fluid is acidic. The electrolyte is then preferably a solution of additives in water, where the additives at least comprise one or more salts. Preferably such salts do not comprise chloride containing salts or hologenide salts in general. The water is then electrolysed to hydronium ions and hydroxide ions. It is noted however that other electrolytic cells for providing such basic and acidic fluids can be used with the invention.

BRIEF DESCRIPTION OF THE DRAWINGS

The invention is described in more detail with reference to the accompanying schematic drawings which are not to scale and graphs, wherein.

DETAILED DESCRIPTION OF THE EMBODIMENTS

Figure 1:
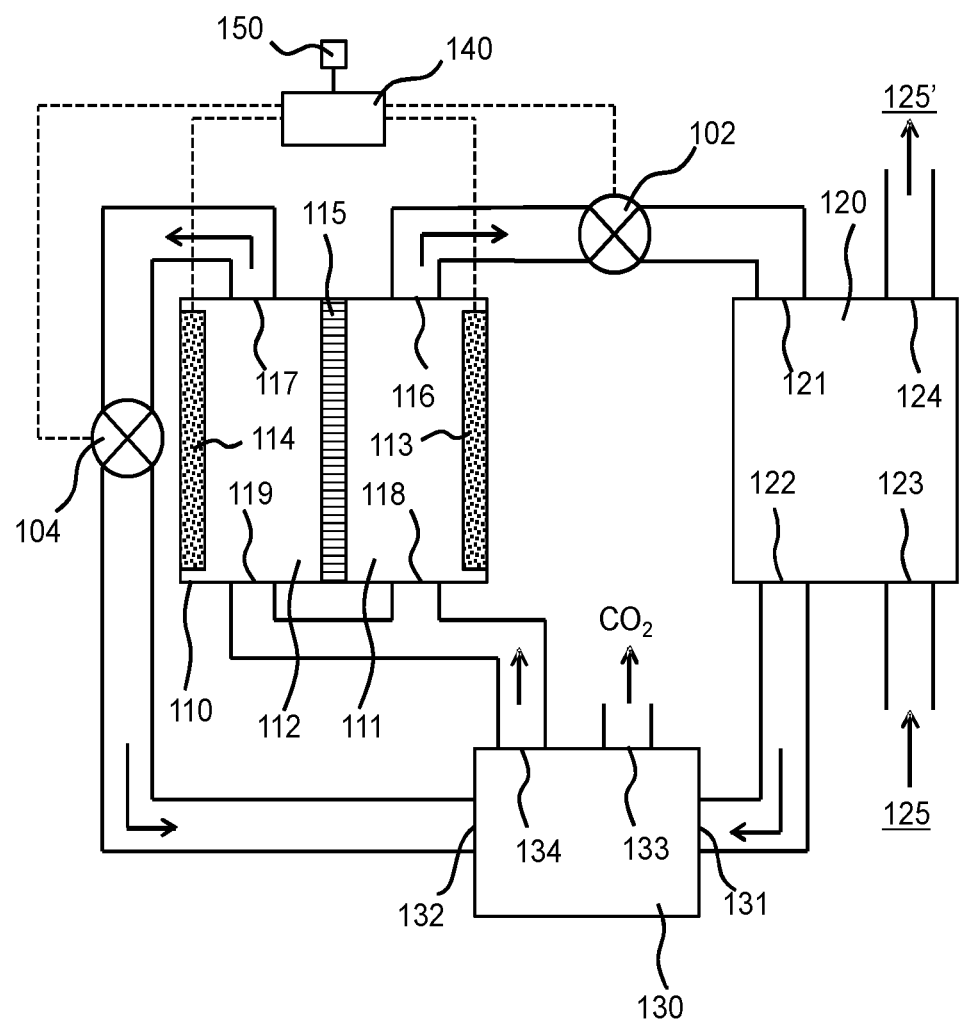
FIG. 1 depicts an air purification system including a target gas capture device.

The invention is described in more detail and by way of non-limiting examples herein below. The same reference numerals are used throughout the Figures to indicate the same or similar parts.

Within the context of the invention the following terms have the meaning as given below.

The term 'electrolyte' means any (chemical) composition containing $H_2O$, whether solid, liquid or gaseous, and whether in the form of pure single compound or in the form of a mixture of compounds, which is capable of being electrolyzed to generate hydronium and/or hydroxide ions for use in the capture fluid and/or the recombination fluid. The mixture of compounds can be one major compound with additional substances.

Preferably, the electrolyte is a liquid electrolyte, so that it can conveniently serve as the capture fluid and/or the regeneration fluid after electrolysis. The electrolyte or the liquid electrolyte comprises or consists of water as a constituent to be electrolyzed for generating the hydronium and/or the hydroxide ions.

If the electrolyte is a liquid electrolyte, then it preferably comprises water as the main solvent or even as the only solvent. A liquid electrolyte preferably comprises at least 30% water by volume, or at least 50% water by volume, or at least 90% by volume. The liquid electrolyte may comprise only water as a liquid.

The term 'additional substances' is meant to include chemical substances such as salts and molecules (organic or mixed organic-inorganic). These, among others, may have one or more of the following functions: improving the electrical (or ionic) conductivity of the electrolyte, lowering the freezing-point of a liquid electrolyte or other fluid used in the invention (e.g. anti-freeze salts or ante-freeze liquids) to below temperatures at which the invention is practiced, suppressing the evaporation of water from the electrolyte, providing counterions to the hydronium or hydroxide ions generated by electrolysis in the capture fluid and/or recombination fluid.

Where such chemical entities are added to the liquid electrolyte, these preferable are electrolytically inert. Electrolytically inert here means that the entities are stable under the electrolysis conditions used within the device salts, and/or do not react with the substrate (e.g. target gases to be captured by the device) and/or the reaction products resulting after reaction of the substrate (e.g. target gas) with the liquid electrolyte. If the substrate comprises $CO_2$ and the target gas is $CO_2$, such reaction products can be for example carbonate or bicarbonate anions that are the result of the reaction between $CO_2$ and the $OH^-$ in the capture fluid (see herein below).

The various apparatuses, devices and/or systems according to the invention may or may not include water and/or liquid electrolyte(s). If any one of these is excluded, they may be added prior to and/or during operation of the apparatuses, devices and/or systems. They may be provided with a device or system as in a kit of parts. The device or system of the invention can include a manual describing what electrolytes, solvents and/or additional substances to use, in what way, and where to obtain them.

The term 'substrate' means any solid, liquid or gaseous state material sample from which one or more target gases are to be captured. The invention can work particularly well if the substrate is a gaseous state substrate comprising e.g. a mixture of gases. One example of this can be air, with e.g. carbondioxide as the target gas. The substrate does not necessarily have to contain the target gas for the invention to have its advantageous effect. The substrate may be processed in any suitable manner, e.g. the substrate may be presented to the capture fluid in the form of a solid, liquid, a gas or a liquid or gas stream or flow.

The term 'target gas' means any gaseous species that is to be captured by the apparatus or method of the invention. There can be more than one target gases at a particular time in a target gas. The target gas can be present in the substrate in liquid, solid or gaseous form in mixture, dispersion and/or solution.

The term 'gas', is meant to include any gas or mixture of gasses at ordinary thermodynamic circumstances (1 atm pressure and 20 degrees Centigrade temperature), such as a flue gas or an atmosphere, e.g. air, containing a constituent to be removed therefrom. Such a constituent is typically $CO_2$, but can also be another constituent such as: $SO_x$, $NO_x$ and/or other gases that can react with hydroxide ions or with hydronium ions such as $NH_3$.

The term 'fluidically coupled' means that two entities of an apparatus, a device or a system are connected such that a fluid such as liquid or gas) can flow from the one entity to the other. This can be realized using any suitable fluid conduit, e.g. direct connection through opening, a hose, a pipe or the like, which fluid conduit may be made of any suitable material, e.g. a metal, metal alloy, rigid or flexible polymer material and so on.

The term 'acidic' means having excess hydronium ions available. In a watery fluid, acidic means having a pH<7. Analogously, the term basic means having excess hydroxide ions available. In a watery fluid, basic means having a pH>7. The term acidity means a degree of acidity (or basicity) which depends on the actual concentration of hydronium ions. Hence acidity is a term that can be used to indicate acidic conditions (pH<7), neutral conditions (pH=7) and basic conditions (pH>7).

Active agitation can be any external action driven way of intensifying the exposure in the exchange device or the contacting in the regeneration device. It can be for example: stirring, mixing, shaking, centrifuging, pumping using any kind of mechanical, electrical, magnetic or other type or material parts.

A toxic substance is a substance that can damage a whole organism where an organism can be an animal, bacterium, or plant, or a substructure of such organism such as a cell or an organ. More specifically, a toxic substance is a substance having a toxicity rating of 4 or less, preferably of 3 or less on the Hodge and Sterner scale.

FIG. 1 depicts a gas purification system 100. The arrows in FIG. 1 indicate the intended direction of the various fluid streams in the system 100 in operation. The system 100 includes an apparatus for capturing a target gas of a substrate. The apparatus in turn includes: a generation device 110 having an electrolysis device for electrolyzing water in an electrolyte, an exchange device 120 and a regeneration device 130 both of which are fluidically coupled to each other and to the generation device as explained below. The devices 120 and 130 can be made in the form of compartments of the apparatus. In that case connections can just be openings with or without valves between the compartments. In the example of FIG. 1 they are however fluidically connected with pipes.

The electrolysis device comprises a first compartment 111 including a first electrode 113 and a second compartment 112 including a second electrode 114 and is further configured for electrolyzing water of the electrolyte present in the first and second compartments using the electrodes. The apparatus is thus configured such that during and because of the electrolysis, a capture fluid can be formed in the first compartment 111 and a recombination fluid different from the capture fluid can be formed in the second compartment 112. The first electrode 113 and the second electrode 114 may be realized using any suitable electrode material, but preferably is realized using inert electrodes comprising or consisting of platina, gold, carbon. In this case the electrodes are made of platina. Other electrodes may be used as described herein below.

The first compartment 111 and the second compartment 112 are in ionic communication with each other through an ion communication structure that is substantially impermeable to hydronium ions and hydroxide ions, for example through an ion-selective membrane or a salt bridge. In this manner, recombination of hydronium and hydroxide irons generated by the water electrolysis in the respective compartments can be suppressed, thus maintaining sufficient concentrations of such ions in the capture fluid generated in the first compartment 111 and the recombination fluid generated in the second compartment 112, which fluids have a purpose and will be explained in more detail below. This for instance facilitates the generation of a particularly safe and compact apparatus suitable for use in domestic and small business environments, which can capture relatively modest amounts of target gases such as $CO_2$ without requiring the electrolysis of species other than water, e.g. causing the formation of potentially harmful reaction products such as chlorine gas.

In order to explain how the apparatus can work an example is described in which the target gas is $CO_2$, the electrolyte is a liquid electrolyte comprising of a solution of a salt in water and the substrate is a gaseous substrate comprising $CO_2$ such as e.g. air. It is noted however that without loss of the advantages of the invention, with the device of FIG. 1, other gases can be captured from a multitude of different substrates using different $H_2O$-comprising electrolytes optionally loaded with a variety of electrolytically inert additives/salts as will be described herein below.

Since the target gas in this case is $CO_2$ which dissolves in basic or alkaline water, the first electrode 113 is arranged as a cathode and the second electrode 114 as an anode during electrolysis. In this way the capture fluid will be basic and thus be able to dissolve or take up $CO_2$ in the exchange device according to chemistry further described herein below. Furthermore, the recombination fluid will then be acidic.

At the electrodes the following half-reactions will take place upon electrolysis of the water in the device 110:
Second electrode (anode) reaction (oxidation of water):

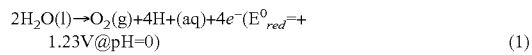
(1)

First electrode (cathode) reaction (reduction of water):

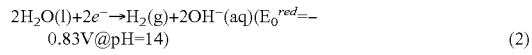
(2)

Thus, the water electrolysis creates a capture fluid with relatively high pH, i.e. higher than 7 in the first compartment 111 due to the increased $OH^-$ ion concentration. The capture fluid taken/drained from that compartment 111 therewith is basic due to the excess $OH^-$ ions. The excess $OH^-$-ions are counterbalanced by the salt cations that were added to the electrolyte beforehand. At the same time, the water electrolysis creates a recombination fluid of relatively low pH, i.e. lower than 7 in the second compartment 112 due to formation of $H_3O^+$-ions ($H^+$ if the electrolyte is water free). The recombination fluid taken/drained from that compartment 112 therewith is acidic due to the excess $H_3O^+$-ions. These ions are counterbalanced by the salts anions that were added to the electrolyte beforehand.

The hydrogen gas and oxygen gas generated in the water electrolysis may be captured or may be vented from the device 110. The captured hydrogen gas for instance may be used as fuel for a fuel cell, wherein the reaction product of the fuel cell, i.e. water may be fed back to the device 100. Part of the hydrogen and or oxygen gas may circulate in the device without causing any (health or other) trouble.

In the example of FIG. 1, the electrolysis device 110 further comprises an ion-selective membrane or diaphragm 115 as an embodiment of an ion communication structure separating the first compartment 111 from the second compartment 112 in order to prevent the large-scale recombination of the generated hydronium ions and hydroxide ions, but to maintain electrical coupling (e.g potential) between the capture and recombination fluid to keep electrolysis commencing. The membrane or diaphragm 115 thus provides reduced ion passage. Preferably it provides reduced or even negligible passage of the hydronium and or the hydroxide ions, but is penetrable for other ions such as the cations and anions of one or more of the added salts. For example, an ion-specific membrane such as a Mustang Q anion exchange membrane as marketed by the Pall Corporation may be used. As such membranes or diaphragms are well-known per se, this will not be explained in further detail for the sake of brevity only. It is noted that any suitable membrane or diaphragm 115 that reduces rate of hydronium and hydroxide ion recombination may be used for this purpose.

Alternative to membrane compartment separation, the first compartment 111 and the second compartment 112 may be physically separated (as with two separate electrolyte containing vessels), but electrically interconnected through an ion communication structure in the form of a salt bridge, which salt bridge may be fitted in a replaceable manner if needed to allow periodic replacement of the salt bridge upon its salt depletion.

In another variant of the cell above, the first and second compartment may not be separated at all, or be only partly separated from each other by the membrane or just a wall. As long as the electrolysis device is configured or operated to enable water electrolysis without complete recombination of the $H_3O^+$ ions and the $OH^-$ ions generated such that the capture and recombination fluids taken/drained from the device are still basic and acidic, the electrolysis device will work for the invention.

In the example of FIG. 1, the first compartment 111 forms part of a first closed loop that further includes the exchange device 120 and the regeneration device 130, whereas the second compartment 112 forms part of a second closed loop that further includes the regeneration device 130, but not the exchange device 120.

The exchange device 120 is arranged to receive the capture fluid from the first compartment 111 to bring the capture fluid in contact with the substrate; i.e to expose the capture fluid to the substrate.

In the example the target gas is $CO_2$ contained in the substrate that is of gaseous nature, e.g. air. Upon contacting this substrate with the basic capture fluid, i.e. comprising hydroxide ions (pH<7), the following reactions may take place in the exchange device 120:

$$CO_2(g) \leftrightarrows CO_2(aq) \quad (3)$$

$$CO_2(aq) + OH^-(aq) \leftrightarrows HCO_3^-(aq) \quad (4)$$

$$HCO_3^-(aq) + OH^-(aq) \leftrightarrows CO_3^{2-}(aq) + H_2O(l) \quad (5)$$

Thus, $CO_2$ is exchanged between substrate (air) and capture fluid as it dissolves in the capture fluid after which it is converted in bicarbonate ions and/or carbonate ions. The contacting step thus results in the capture fluid to become an exchange fluid that may contain any captured target gas, being $CO_2$ in this case.

To transport the capture fluid to the exchange device, the first compartment comprises a capture fluid outlet 116 and the exchange device 120 comprises a capture fluid inlet 121 fluidically connected to the outlet 116.

The capture fluid inlet 121 is typically in fluidic connection with an exchange fluid outlet 122 such that the capture fluid can be fed through the exchange device 120 from the inlet 121 to the outlet 122.

In this example, the exchange device 120 further comprises a substrate inlet 123 for introducing the substrate into the exchange device. Although in this case the substrate inlet is a gas inlet for feeding a gas stream 125 to the exchange device, in general the type of substrate inlet will depend on the nature of the substrate to be entered into the exchange device. The substrate inlet 123 is in this example in fluid connection with a substrate outlet 124 of the exchange device such that the substrate can be fed through the exchange device 120, while contacting the capture fluid in the exchange device. As an alternative, there is no further outlet 124 at the exchange device and the substrate leaves the exchange device with the capture fluid through exchange fluid outlet 122. Removal of the substrate may be performed at some other location of the apparatus.

In the example of FIG. 1 the remainder of the substrate that entered the exchange device leaves the exchange device through the further outlet 124 as a gas stream 125' that may be at least partly purified with respect to the target gas. In this case the substrate is purified with respect to its $CO_2$ content.

Within the exchange device 120, contact between the capture fluid and the substrate may be established in any suitable manner. In this case, the substrate gas is fed, e.g. bubbled, through the capture fluid. However other methods can be employed. These can make use of agitation in the form of stirring or the like using appropriate stirring devices for intensifying contact between capture fluid and substrate. Alternatively, the exchange device 120 may comprise a member having a relatively high surface area such as: one or more material in the form of small particles such as beads or the like (e.g. glass or other material beads), a porous material, cloth or the like, with the capture fluid being fed through said member and the gas being brought into contact with said member.

The capture fluid inlet 121 may be arranged at a first end of the exchange device 120 whereas the substrate inlet 123 may be arranged at a second, e.g. opposite, end of the exchange device 120 to implement a contraflow reactor for increased exchange efficiency.

In yet another alternative, the capture fluid may be nebulized in the exchange device 120, e.g. by spraying it into the exchange device 120 to increase the contact surface area between the capture fluid and the gas.

Other suitable solutions for achieving good contact between the capture fluid and the substrate within the exchange device 120 will be apparent to the skilled person.

The capture fluid can be prevented from escaping through the substrate inlet and outlet by design, e.g gravity and/or air pressure, but additional preventative measures may be used.

Although not shown, in an alternative example the exchange device 120 may be divided into two sub-compartments separated by a gas-permeable membrane to avoid the capture fluid from escaping the exchange device 120 through one of the inlet 123 and the outlet 124. Alternatively, the inlet 123 and the outlet 124 may be fitted with a gas-permeable membrane or a hydrophobic membrane for this purpose. Such a gas-permeable membrane may have the additional advantage that the humidity of the purified gas stream 125' may be controlled. The presence of such membranes prevents nebulized or evaporated fluid from escaping the exchange device 120 with the gas stream through the device. Also separation of the two streams by e.g. such membranes allows that the substrate stream can be a liquid stream that is prevented from mixing with the capture fluid, but does allow exchange of the actual target gas in the substrate. This may be advantageous if the substrate stream includes materials that must not mix with the capture fluid such as for example other solvents than water, or if the capture fluid must be prevented from losing water or other constituents.

Other measures for preventing the capture fluid from escaping the exchange device 120 through one of the inlet 123 and the outlet 124 will be apparent to the skilled person.

The gas-capture fluid interface established in the exchange device 120 may further act as a purification filter by capturing particles or other contaminants from the gas stream 125 using the capture fluid (in the case of FIG. 1 this would be water), as the filtration material. Alternatively, a water-based filtration functionality may be incorporated in front of the exchange device 120, enabling the consumer an easy replacement of the water used for filtration.

In the example of FIG. 1, the exchange fluid outlet 122 is fluidically connected to an exchange fluid inlet 131 of the regeneration device 130 such that the regeneration device 130 can receive the exchange fluid possibly having captured target gas. Thus, in the example with the gaseous substrate including the $CO_2$, the received capture fluid can contain e.g. the dissolved $CO_2$, bicarbonate ions and carbonate ions. The regeneration device 130 further comprises a recombination fluid inlet 132 fluidically connected to the recombination fluid outlet 117 of the second compartment 112 of the device 110 for receiving the recombination fluid, which in this case is acidic i.e. has pH<7, from the second compartment 112.

The regeneration device 130 is arranged to bring the exchange fluid received from the exchange device 120 in contact with the recombination fluid received from the second compartment 112. This is to cause and allow one or more of the following: the release of at least part of any $CO_2$ captured by the exchange fluid through reaction of bicarbonate ions and/or carbonate ions of the exchange fluid with hydronium ions or the recombination fluid; the regeneration of part of the electrolyzed water by recombination of the hydroxide ions of the capture fluid with the hydronium ions of the recombination fluid and regeneration of salts added to the electrolyte by recombination of the cations of the exchange fluid and anions of the regeneration fluid.

The contacting in the regeneration device can be facilitated by a construction that allows mixing of the exchange fluid with the recombination fluid. The device 130 in this example comprises an agitation arrangement for actively mixing, stirring or shaking. Alternative or in combination with this the contacting may also be done with a contraflow arrangement as described for the exchange device with entrances for exchange fluid first and recombination fluid at e.g. opposite ends of the regeneration device 130. Any suitable mixing arrangement may be used, including the ones having passive elements such as the beads for intensifying contact as described for the exchange device.

The released target gas, in this example $CO_2$, may be vented or collected from the apparatus or regeneration device 130. This can be done through a target gas outlet 133, where the released gas for instance may be collected for further use, as will be explained in more detail below.

In the example of FIG. 1, part of, or the entire combined exchange fluid and recombination fluid are fed back to the generation device and in particular the electrolysis device 110 for renewed use. This can be done in any suitable manner. In FIG. 1, this feedback is allowed through fluidically connecting a regeneration fluid outlet 134 of the regeneration device 130 with a regeneration fluid inlet of the electrolysis device 110. Since in this example the electrolysis device has separated compartments, the regeneration fluid is split into an inlet 118 of the first compartment 111 and a further inlet 119 of the second compartment 112. Such splitting may not be necessary if the first and second compartments are in fluidic contact with each other as described herein above as alternative ways to define the electrolysis device.

With the construction as described above, the apparatus in FIG. 1 employs a closed loop flow operating principal. The principle includes two partial loops each originating from and terminating at the device 110. The first partial loop runs from the first compartment 111 through the exchange device 120 and the regeneration device to arrive at the device 110 again. This is the loop comprising the flow of capture fluid and exchange fluid for capturing the target gas (e.g. $CO_2$). The second partial loop runs from the second compartment 112 through the regeneration device 130 to end at the device 110 again. This loop is for providing the recombination fluid to the regeneration device to cause release of captured target gas and regeneration of electrolyte components. Hence, the device of FIG. 1 can be operated in a stand-alone stepped or continuous mode without having to replenish electrolyte components such as the added salts. In the device of FIG. 1 some water may be lost, e.g. due evaporation of water through the outlet 133 of the regeneration device 130 or though any other known way of water loss from a closed system. This water can be replenished by periodical or continuous replenishment using a water inlet. Although not specifically shown, such water inlet is preferably present between the regeneration device and the outlets of the device 100.

In an alternative example that can operate in a non-stand alone step wise or continuous mode, the apparatus may be part of an external electrolyte/water waste/replenishing loop such as e.g. water tap and drain system. In that case one or more of the inlets 118 and 118 are not connected to the outlet 134, but to a source of water or source of liquid electrolyte comprising the water. Also the outlet 134 is then connected to a drain of liquid electrolyte or water drain. Such connections can also be additive to the connections as drawn in FIG. 1 offering opportunity to replenish water.

To illustrate capabilities and important aspects of operation of a device and method according to the invention such as for example that of FIG. 1, the case of $CO_2$ capture is further detailed. Without wanting to be bound by theory, operating conditions can be estimated using the following considerations.

Thus, from a gasphase substrate such as air, $CO_2$ gas dissolves in the capture fluid, which is a watery solution of salts, according to the reaction of equation 3 (see herein above). The concentration of $CO_2$ in the fluid (mainly water) is determined by Henry's law; $p(CO_2)=k_H[CO_2(aq)]$ where $p(CO_2)$ is partial $CO_2$ pressure, $k_H(CO_2)$=29.41 L*atm/mol (@T=298K) and $[CO_2(aq)]$ is concentration in water. Thus, for $p(CO_2)$ ~1000 ppm @ 1 bar this results in $[CO_2(aq)]$=3.4 $10^{-05}$ mol/L.

The dissolved $CO_2$ reacts with water to form carbonic acid that dissociates partly according to the following equilibria and the respective associated equilibrium constants $K_h$, $K_{a1}$ and $K_{a2}$:

$$CO_2(aq)+H_2O \leftrightarrows H_2CO_2(aq) \leftrightarrows HCO_3^- + H_3O^+ \leftrightarrows CO_3^{2-}+2H_3O^+ \quad (6)$$

Wherein:

$$Kh = \frac{[CO_2(aq)]}{[H_2CO_3(aq)]} = 1.7*10^{-3} \quad (7)$$

$$Ka1 = \frac{[HCO_3^-][H_3O^+]}{[H_2CO_3(aq)]} \Rightarrow p_{Ka1} = 3.6 \quad (8)$$

$$\left(Ka1' = \frac{[HCO_3^-][H_3O^+]}{[H_2CO_3(aq)]+[CO_2(aq)]} \Rightarrow p_{Ka1} = 6.3\right) \quad (9)$$

$$Ka2 = \frac{[CO_3^{2-}][H_3O^+]}{[HCO_3^-]} \Rightarrow p_{Ka1} = 10.4 \quad (10)$$

Continuing from the dissolved $CO_2$ with $[CO_2(aq)]$=3.4 $10^{-05}$ mol/L (see above), and using the above considerations where the second dissociation of $HCO_3^-$ into $CO_3^{2-}$ and $H_3O$ ($K_{a2}$), the minimal concentration of $HCO_3^-$ which is present in pure (demi)water (at pH=6) are ignored and it is assumed that all $CO_2$ is removed from the water (by the regeneration device) in a full cycle of the apparatus when in operation, the estimations in the below table for the required flow of capture fluid can be derived for a device that provides a continuous flow of capture fluid:

| pH | $[H_3O^+]$ [Mol/L] | $[HCO_3^-]$ [Mol/L] | Flow speed [L/hour person] |
|---|---|---|---|
| 8 | $10^{-8}$ | 1.45 $10^{-3}$ | 850 |
| 9 | $10^{-9}$ | 1.45 $10^{-2}$ | 85 |
| 10 | $10^{-10}$ | 1.45 $10^{-1}$ | 8.5 |
| 11 | $10^{-11}$ | 1.45 | 0.85 |

The capacity for capturing target gas is thus approximately linear with pH, although without all assumptions above, this does not always need to be the case. Nevertheless, according to the above it is approximated that to absorb all $CO_2$ generated by 1 person a continuous water (and thus capture fluid) flow with pH=11 of 0.015 L/min (0.85 L/hour) would be required.

In an embodiment, the apparatus has a controller 140 electrically coupled to the first electrode 113 and the second electrode 114, wherein the controller 140 is adapted to generate a control signal having a minimum value sufficient to generate the water electrolysis half reactions at the first electrode 113 and the second electrode 114 respectively. The controller 140 is further configured to vary the value of the control signal in order to control the rate of water electrolysis at the first electrode 113 and the second electrode 114 respectively. In this manner, in a particular embodiment the apparatus may be configured to generate a flow of the capture fluid and/or the regeneration fluid from 1 liter to 10,000 liter per hour, preferably from 10 liter to 1,000 liter per hour. The controller 140 may be adapted to control the pH of the capture and recombination fluids as well as the fluid flow rates through the apparatus. The controller 140 may control the pH and fluid flow rates independently or dependently in order to effectively capture a target gas such as $CO_2$ from an enclosed space having a volume in the range of about 2 to about 20,000 m$^3$ for example (smaller or larger volumes are also feasible), i.e. target enclosed spaces such as rooms, offices, conference areas, greenhouses or other plant growth facilities, vehicles, and so on.

Those skilled in the art will be able to do similar estimations for other target gases such as the $SO_x$ and $NO_x$ or e.g. NH3 using the relevant values of the above used parameters (such as e.g. the relevant dissolution characteristics and equilibrium constants of such gases) and thus practice the invention for these other target gases.

The apparatus of the invention, like that of FIG. 1, is preferably operated such that the pH of the capture fluid is between pH=3 and pH=11, and in extreme cases between pH=0 and 14. The operation of the device within the less stringent pH conditions facilitates the design of the device and allows less stringent parameters to be used during use as will be further explained herein below while providing a good target gas capacity and its control through pH. Preferably the device is operated such that the pH of the capture fluid is between 7 and 14 as an important group of target gases is capable of dissolving in basic conditions as elucidated for $CO_2$ or the $SO_x$ and $NO_x$ herein above.

Besides from the absolute scale of the device (fixed volumes etc), the method and device of the invention provides advantageous control of its target gas capture capacity (and release capacity) as it allows the use of the above elucidated chemical and physical model of gas capture. Thus, such capacity is dependent on, among others, pH and the rate of flow of the capture fluid. Such control is advantageous in view of the envisaged applications of the device as climate control device, whether in the form of target gas capture device and/or in the form of target gas provision device.

Thus it is observed that the more extreme the pH value is, the lower the flow of capture fluid may be to capture the same amount/concentration of target gas. The control of pH in the capture fluid is in turn dependent on a number of device and/or method parameters. These include for example the rate of electrolysis, i.e. the rate of generation of base or acid, and the rate of flow of the capture fluid and/or the recombination fluid. Each of these can be optimised or adjusted alone or in combination for control purposes.

Thus the controller 140 of the device of FIG. 1 may be capable of controlling the rate of electrolysis and/or the rate of flow of the capture fluid.

While for power provision the apparatus can be connected to an external power source, such as a battery, or external standard electricity provision network in the form of power grid, the controller 140 is further configured for transforming and controlling the external power such as to provide a variable DC voltage and/or variable DC current (if both are controlled effectively the power to the electrodes is variably controlled) to either one of the first and second electrodes used for electrolysis. In this case since electrolysis is performed with electrodes of one closed electrical loop, the controller is capable to provide a variable voltage difference and/or current trough this loop. Current can be controlled e.g. by setting and/or adjusting DC voltage over the electrodes. The control of current is directly related to the rate of electrolysis through the redox half reactions taking place at the respective electrodes.

The control of current can be done by measuring a current through either or both of the electrodes as function of voltage applied across the electrodes. The person skilled in the art will know how to provide controllers capable of electrical control with feedback loops etc. such as current and/or voltage control.

As described above, a suitable power supply can be part of the device or controller, but can also be peripherally present on the location of use of the device. The device can have a power supply that can be directly connected to the power grid available at any one particular location for example, while the power supply can deliver the DC current control for the electrolysis.

In the device of FIG. 1 electrodes are part of one and the same electrical loop. However, in alternative embodiments, additional electrodes can be present and electrically connected such that the electrolysis half reactions take place in decoupled way. This may require that the electrolysis device has in fact two electrolysis vessels, one for the oxidation and one for the reduction, and that can operate independently form each other. Reference electrodes of any type can be used in any setup in order to define absolute potentials against the reference. All such setups can be controlled as described above with respect to rate of electrolysis.

The control signal, e.g. the voltage applied to operate the device should be sufficient to start water electrolysis and beyond that is merely a means to reach a specific current of choice against an electrical resistance. Practically, this means the applied voltage should exceed 1.23V plus any over-potential created by the electrochemical properties of the electrode surface material. Preferably the voltage across the electrodes is >1.5 V, >2V, >3V, >4 V, >5V, >7.5V, or even >10V.

A sufficient current for electrolysis is important for the operation of the device as it is one of the parameters determining the gas capturing power through the pH reached in the capturing liquid (see above example for $CO_2$). The electrolysis current required in situations sometimes can reach as high as 50 A. Thus, in larger capacity devices high current power provision is preferred. For example with regard to the $CO_2$ gas capturing device, the removal of $CO_2$ of 1 person (1.3 kg $CO_2$ per day) a minimal constant removal of 55 g $CO_2$/hour from the air is needed. Assuming that every electron creates an OH-molecule, which binds to a $CO_2$ molecule, the calculated power needed is ~40 W per person, which translates to an electrolysis current of ~33 A @ an electrolysis potential difference of 1.25V).

The electrical current attainable for electrolysis at a certain voltage across the electrodes in a device according to the invention can be adjusted or set through a number of parameters related to the internal resistance of the cell, such as for example: the design of the electrodes, the device 110 and the conductivity of the electrolyte.

For design of the electrodes, increase of surface area results in lowering of internal resistance of the cell and increased current flow. Further, cell design leading to decrease of distance between first and second electrodes will lead to reduced internal resistance and increased current flow. The electrodes can have fixed design and mounting in the cell. Alternatively, one or more of these can be provided in variable form. For example the distance between electrodes can be alterable or the area of electrodes contacting the electrolyte can be alterable (through insertion or removal from the electrolyte). These parameters can be individually and together controlled by the controller to adjust rate of electrolysis.

The electrical conductivity of the electrolyte can be influenced through ion concentration and/or viscosity of the electrolyte. Increasing the salt concentration in a fluidic/liquid water-based electrolyte will increase its conductivity. Such salts are typically electrolytically inert as previously explained. Salt concentrations for the invention can be between 1 mM to 15M. Preferably the concentration is >5 mM, >10 mM, >100 mM, >0.5M, >1M, >2, >3 M, >5M, >7M, >10M. Saturation concentrations of the salts in the solvents of the electrolyte can be used. If the electrolyte is mainly water, such Maximum solubility of some salts amounts to: $NaNO_3$~900 g/l (~10.7M) $Na_2SO_4$~200 g/l (~1M) $KNO_3$~320 g/l (3.1M) $K_2SO_4$~120 g/l (0.8M), $ZnSO_4$~550 g/l (~3.4M), $AgNO_3$~2560 g/l (~15M). Those skilled in the art will know how to select salts based on their solubility or solubility product from literature reference data such as The Handbook of Physical and chemical constants, or Chemical Abstracts or the internet: http://en.wikipedia.org/wiki/Solubility_table.

A relatively high (total) concentration of the one or more salts in the electrolyte solvent is preferred. This will give enhanced electrolysis due to increased capability of ionic current conduction in the electrolyte. Furthermore, this will increase the amount of counter ions in the electrolyte and therewith the maximum pH reached for the capture fluid and/or the recombination fluid.

To reach high capturing power, at voltages lower than say 10 V, optimisation of the cell in combination with high salt concentration in the cell electrolyte may be necessary according to methods described herein above.

With regard to a liquid electrolyte composition for the invention, one or more salts can be added to the electrolyte to aid current conduction. Such salt used is stable under potentials applied to the electrodes of the electrolysis device. The salt must have some solubility in the electrolyte solvent.

In general halogenide (Fluoride, chloride, bromide and iodide), nitrate and sulfate salts fulfil this requirement as do many lithium, sodium and potassium salts. Such salts are for instance $LiNO_3$, $Li_2SO_4$, $NaNO_3$, $KNO_3$, $Na_2SO_4$, $K_2SO_4$, etc. Zn and Ag salts (e.g. $ZnSO_4$, $AgNO_3$), will also work, although a silver salts will be much more expensive that the others. Lithium salts may be also soluble in electrolytes that do not have water as the major solvent. Solvents that may be used in addition to water can be polar solvents such as e.g. alcohols (methanol or ethanol) or Dimethyl formamide, dimethyl sulfoxide acetonitrile.

F, Cl and Br (and possibly I) containing electrolyte additives such as the halogenide salts including the sodium and potassium salts of these should not be used, as they might form toxic gasses such as $Cl_2$ upon use in the apparatus. Iodine is however less problematic than Chlorine as it is less toxic and not gaseous. It might even be disinfecting the system from any contaminants that enter the apparatus via the air purified. Other electrolyte added substances can be for example anti freeze such as ethylene glycol or other alcohols such as those chosen from the group consisting of: methanol, ethanol, n- or iso-propanol, n- or iso-butanol cyclohexanol.

The gas capturing power of the device is in part also dependent on the speed with which the captured gas is removed from the system in the regeneration device, as this determines the speed of recovery for renewed capture. The recovery of gas from a basic or acidic solution after its capture with such a solution is in general rather slow. For example the regeneration of $CO_2$ gas according to the reverse reaction stated above has a rate constant of only ~0.23 $sec^{-1}$ compared to capturing with a rate constant of ~0.039 $sec^{-1}$. The invention advantageously makes use of regeneration by recombining (adding) the recombination fluid stream generated at the other electrode as that of the electrode where the capturing fluid was generated with the gas containing exchange fluid. For the $CO_2$ case this means that an acidic liquid is added to the gas containing basic stream. This will at least partly drive out the gas (e.g. carbonic acid) and increase speed of recovery of the gas.

In an embodiment, the gas purification system 100 of FIG. 1 further comprises one or more pumps for pumping the capture fluid and the recombination fluid through the system. By way of non-limiting example, a first pump 102 and a second pump 104 under control of the controller 140 are shown. It should be understood that any suitable number of pumps in any suitable location of the gas purification system 100 may be applied, and that these pumps may be controlled in any suitable manner, e.g. by one or more controllers such as the controller 140 or another controller (not shown) of the gas purification system 100. For instance, the gas purification system 100 may further comprise a pump (not shown) for forcing the gas stream 125 into the exchange device 130. Alternatively, an external pump or the like may be used for this purpose. A preferred place for a pump may be between outlet 134 and inlet 118 or 119 (not shown) as there the fluid stream is approximately neutral or at least less acidic or basic than at the locations of pumps 102 and 104. This may provide less wear of the pump due to such conditions or may make use of cheaper pumps possible. If pumps are positioned in separate fluidic connections before the inlets 119 and 118 and after two way splitting such fluidic connection counted from outlet 134, and if the first and second compartments 111 and 112 are partly or preferably separated from each other by e.g. the membrane 115, this can provide individual control of flow of first and recombination fluid through individual control of the pumps.

A combination of valves and pumps can also be used in the above embodiments.

In an embodiment, the flow speed of the capture fluid and the recombination fluid through the gas purification system 100 may be regulated so as to regulate the exchange rate of the target gas in the gas stream 125 and the capture fluid. The flow rate of the recombination fluid may be matched to the flow rate of the capture fluid to ensure the efficiency of the recombination reaction in the recombination device 130. Thus, the regeneration fluid can be regulated to be pH neutral. But other pH values can be set. This may depend on the target gas release rate to be achieved in the regeneration device. For instance, the capture fluid flow and the flow of the gas stream 125 may be regulated to control the rate of exchange of the target gas from substrate (gas stream 125) to the capture fluid. Such flow rates may be controlled in any suitable manner, e.g. using pumps and/or adjustable valves under control of one or more controllers, e.g. the controller 140.

Other points to control and adjust the capturing capability of the device are: the extent of target gas exchange by increasing or decreasing agitation during contact in the exchange device for example by controlled agitation (stirring, spraying or bubbling of gas etc). A similar control is available at the regeneration device. Such control may be switched of or at a lowest level if the device of the invention is in a operation mode not limited by these efficiencies of contacting. At higher capturing modes they may be switched on.

The controller 140 can be one controller or a plurality of controllers configured to control any one of the parameters explained above. Preferably the controller controls at least the speed of electrolysis and the flow speed of the capture fluid. Preferably also the flow speed of the recombination fluid is controlled. This means one or more of the pumps explained above.

In an embodiment, the apparatus of FIG. 1 has a gas sensor 150 for sensing the target gas abundance or concentration in a confined space or the inlet of substrate etc. Thus in FIG. 1, 150 is a $CO_2$ sensor, with the controller 140 being responsive to the signal of the gas sensor 150. The gas sensor 150 typically is in fluidic contact with the gas stream 125, e.g. the gas sensor may be placed in the gas stream 125 or alternatively in the purified gas stream 125'. In an embodiment, the gas stream 125 is arranged to be fed into the exchange device 120 by means of a separate conduit or chamber (not shown), with the gas sensor 150 being arranged in this conduit or chamber.

Multiple target gas sensors can be used to define differential gas concentrations and provide feedback to the controller to base apparatus adjustment on.

The apparatus can comprise one or more pH sensors for measuring the pH in at least the capture fluid, but preferably also in the recombination fluid and or in the regeneration fluid. As the pH of the capture fluid is directly related to the rate of target gas capture in the exchange device, sensing the pH of that capture fluid can provide good feedback for control of the target gas capture of the apparatus. It provides a measure for the combination of rate of electrolysis and rate of extraction of capture fluid form the device 110.

An additional sensor in the exchange fluid can give indication on the actual amount of target gas captured The apparatus preferably also has one or more flow rate sensors, at least for measuring the capture fluid flow rate, but preferably also for measuring the recombination fluid flow rate and/or the regeneration fluid flow rate.

The control of all parameters described above such as the flow rates, the rate of electrolysis, the rate of exchange or the rate of regeneration can be manual, but preferably it is automatic based on feedback from the one or more sensors described above. The automation can be implemented using software that is present on a memory accessible by a microprocessor in the controller or by software running on a remote device that communicates through standard wireless or wired connections (wifi, LAN or other) with the controller.

In FIG. 1, the gaseous contaminant, e.g. $CO_2$, captured by the capture fluid of the system 100 may be vented from the regeneration device 130 through e.g the gas outlet 133. In some embodiments, the gaseous contaminant may simply be expelled from the gas purification system 100, for instance when the system 100 is used as an air purification unit for removing $CO_2$ from a confined space, in which case the $CO_2$ may simply be expelled into another space, e.g. an open space such as the outside space, i.e. the earth's atmosphere. Examples of such a use will be given in more detail below.

Figure 2:
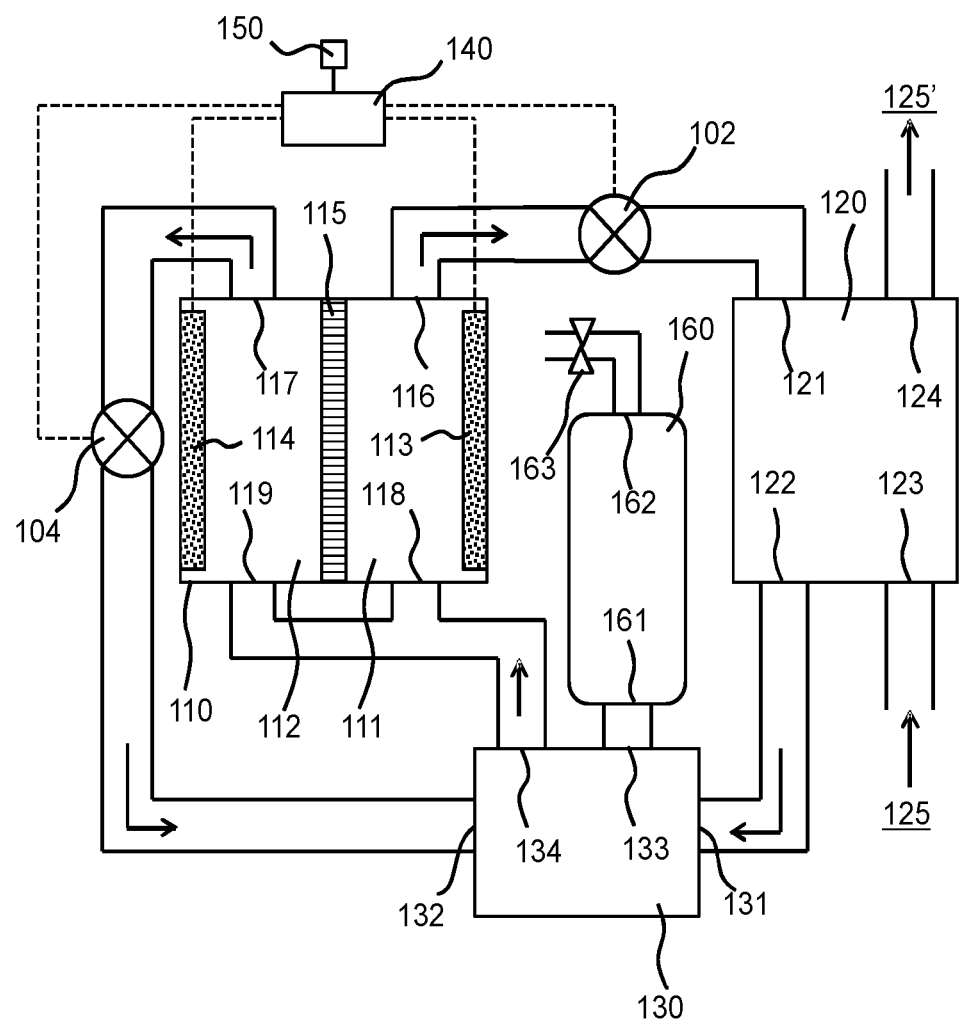
FIG. 2 depicts a target gas capturing system including a target gas capture device.

However, in some other embodiments, the expelled gaseous contaminant, e.g. $CO_2$, may be harvested, e.g. concentrated, at the gas outlet 133 for further use. An example embodiment is shown in FIG. 2, in which the system 100 further comprises a storage tank 160 having an inlet 161 in fluidic connection with the gas outlet 133 and an outlet 162 coupled to a release valve 163. Hence, the expelled gaseous contaminant, e.g. $CO_2$, may be stored, e.g. concentrated, in the storage tank 160 for future use on demand, e.g. in the synthesis of value added products, e.g. a fuel such as methanol for which the gaseous contaminant is a starting material, or in the production of bottled $CO_2$. In such embodiments, the gas purification system 100 is extended with the storage tank 160 to form a $CO_2$ generation system.

In an embodiment, the $CO_2$ sensor 150 may be located in the storage tank 160 or in its outlet 162 for determining the $CO_2$ levels in the gaseous medium inside the storage tank 160 or its outlet 162. This is for instance advantageous if a controlled amount of $CO_2$ is to be delivered to a remote location such as a location in which plants or other $CO_2$-consuming organisms are grown, as will be explained in more detail below.

Another potential application domain in which the target gas (e.g. and especially $CO_2$) released by the gas purification system 100 in the regeneration device 130 may be reused is to offer the target gas for a city farming or horticultural application. For example $CO_2$ can be offered for consumption in a photosynthesis process, in which case the $CO_2$ may be released into a confined space in which the photosynthesis processes take place, e.g. where plants or other $CO_2$-consuming organisms are grown in order to accelerate the photosynthesis process. In some embodiments, the gas purification system 100 may be configured as a gas enrichment system in which a further gas flow is enriched with the target gas released from the regeneration device 130.

To this end, the gas outlet 133 may be located in or in fluid connection with the confined space. The $CO_2$ may be directly released into the confined space from the gas outlet 133 or may be released from the storage tank 160, which provides a particularly good control over the rate of release and/or the frequency of release of the $CO_2$ into the confined space. A $CO_2$ sensor 150 may be placed in the storage tank 160 as previously explained.

Figure 3:
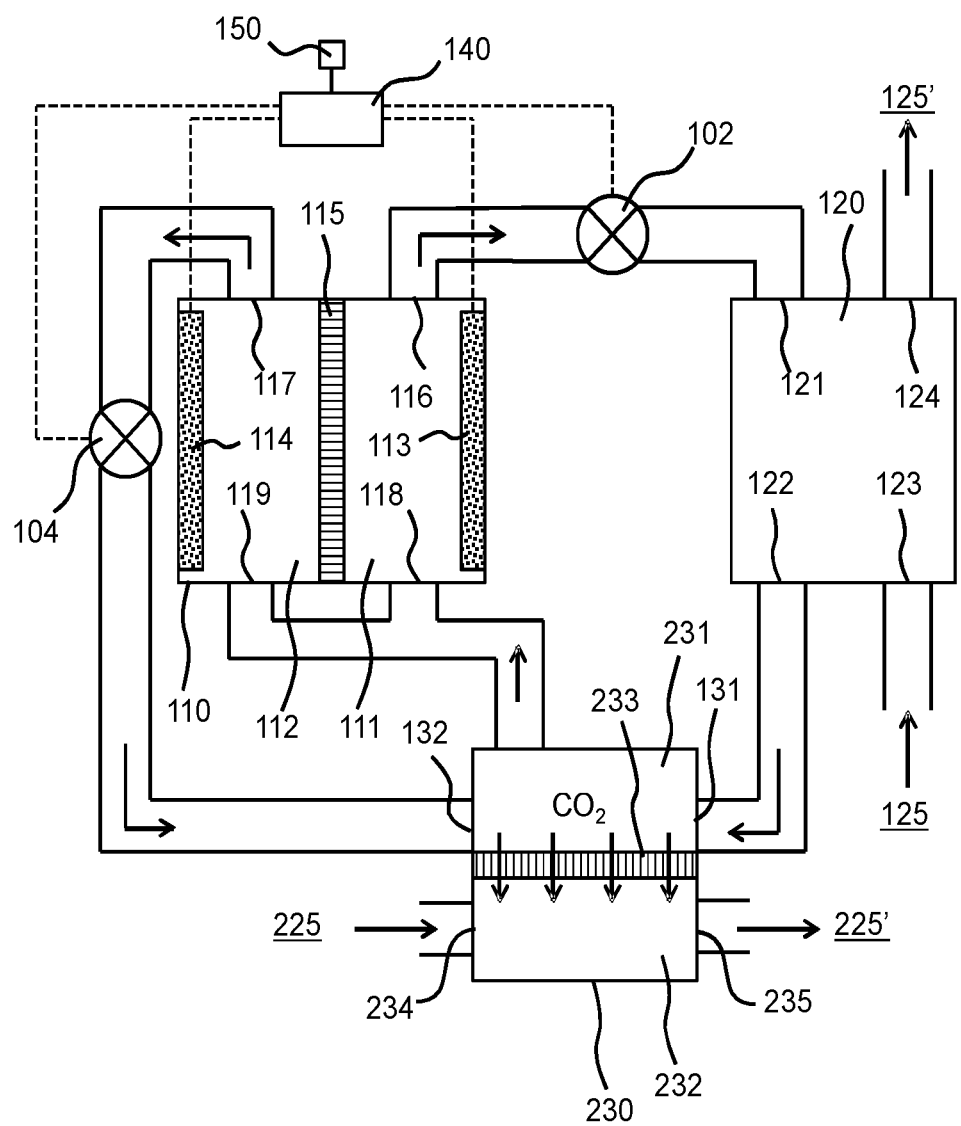
FIG. 3 depicts a target gas enrichment system including a target gas capture device.

In an embodiment as shown in FIG. 3, the gas purification system 100 may comprise a regeneration device 230 in which a further gas flow 225, e.g. an air flow from the confined space is brought into contact with the mixture of the capture fluid and the recombination fluid such that the $CO_2$ released from this mixture can be directly transferred into the further gas flow to produce a $CO_2$-enriched gas flow 225' for release into the confined space. For instance, the further gas flow 225 may be fed into the regeneration device 230 via a gas inlet 234 and the $CO_2$-enriched gas flow 225' may be released from the regeneration device 230 via a gas outlet 235.

In this embodiment, the regeneration device 230 acts as a further exchange device between the mixture of the capture fluid and the recombination fluid on the one hand and the further gas stream 225 on the other hand, and may be arranged in a similar fashion to the exchange device 120. For instance, the gas inlet 234 and the gas outlet 235 may be arranged such that the mixture of the capture fluid and the recombination fluid cannot escape the regeneration device 230 through this inlet and outlet, e.g. by providing a gas-permeable or hydrophobic membrane over the gas inlet 234 and the gas outlet 235 as previously explained.

Alternatively, the regeneration device 230 may comprise a first sub-compartment 231 in which the aforementioned regeneration of water and release of $CO_2$ takes place and a second sub-compartment 232 for receiving the further gas flow 225, wherein the first sub-compartment 231 and the second sub-compartment 232 are separated by a gas-permeable or hydrophobic membrane 233 for retaining the liquid fraction of the capture fluid and the recombination fluid within the first sub-compartment 231.

Several useful implementations of the gas purification system 100 will now be discussed in further detail. It should be understood that these are example implementations only and that other implementations will be immediately apparent to the skilled person.

In a first implementation, the gas purification system 100 may be used as an air purification system to regulate the $CO_2$ levels in a confined space to be occupied by persons for the purpose of maintaining the $CO_2$ level within a desired range, e.g. below a set threshold of for instance 1,000 parts per million (ppm), 500 ppm, 400 ppm or below. Other suitable ranges may also be considered. This ensures that the occupants of the confined space are not exposed to elevated and potentially harmful levels of $CO_2$. The confined space may be any space occupied by one or more persons, e.g. (part of) a domestic dwelling such as (one or more rooms of) a house, a work space such as an office building or part thereof, a public building such as a shopping mall, cinema, theatre or the like, and so on.

Figure 4:
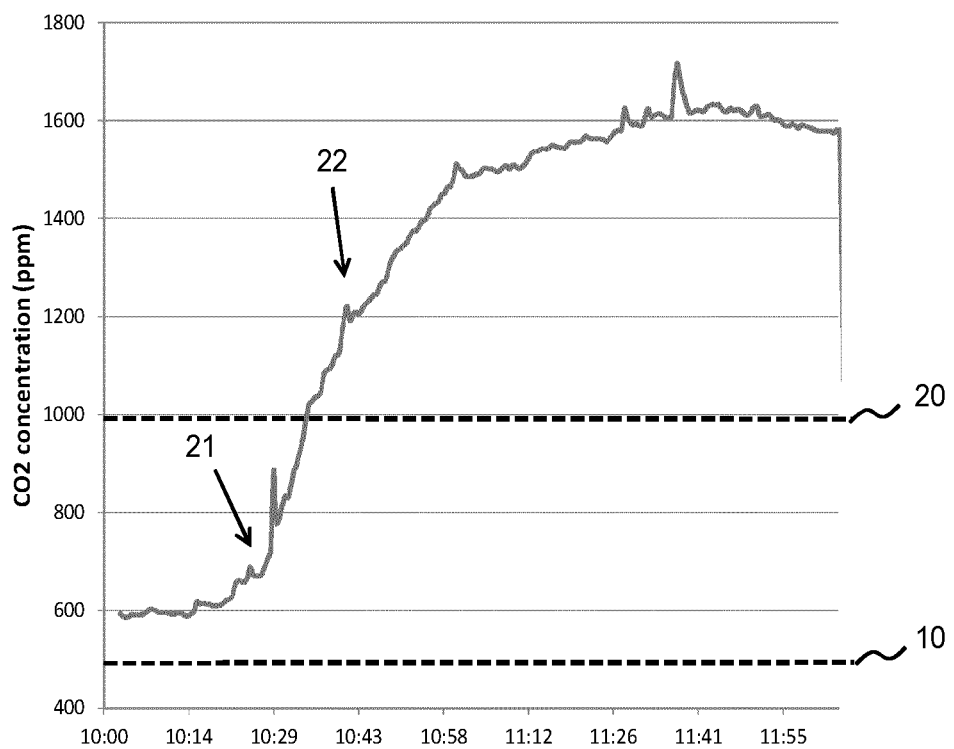
FIG. 4 is a graph depicting the development of the $CO_2$ target gas level over time in an office space occupied by a number of people.

In such confined spaces, a rapid build-up of $CO_2$ levels may be experienced, e.g. through respiration, if the confined space is occupied by one or more persons. This is demonstrated by the graph in FIG. 4, which depicts monitored $CO_2$ levels in a conference room having an approximate volume of 5,000 m$^3$ over time. At point 21 (10:29), a meeting begins involving 36 people, causing a rapid increase of $CO_2$ levels from around atmospheric levels (~500 ppm) indicated by the dashed line 10 to above the upper limit of healthy $CO_2$ levels (1,000 ppm) as per ASHRAE and OSHA standards and as indicated by the dashed line 20. In as little time as about 15 minutes, $CO_2$ levels have increased to around 1,200 ppm as indicated by point 22, well above the upper limit 20.

In order to avoid such elevated $CO_2$ levels, the gas purification system 100 (i.e. an air purification system in the present case) may be arranged such that the exchange device 120 draws in air from the confined space through the further inlet 123 and returns purified air from which $CO_2$ is removed to the confined space, thereby regulating the $CO_2$ levels in the confined space. The captured $CO_2$ may be disposed of as previously explained. In case of the $CO_2$ is simply vented from the gas purification system 100 through gas outlet 133, this is preferably done into an unconfined space such as the open air.

In some embodiments, the gas purification system 100 (i.e. an air purification system in the present case) may be combined with a climate control system such as a heating system or air conditioning system, in which case the gas purification system 100 may be integrated in the climate control system or may be provided as a discrete system separate to the climate control system.

Figure 5:
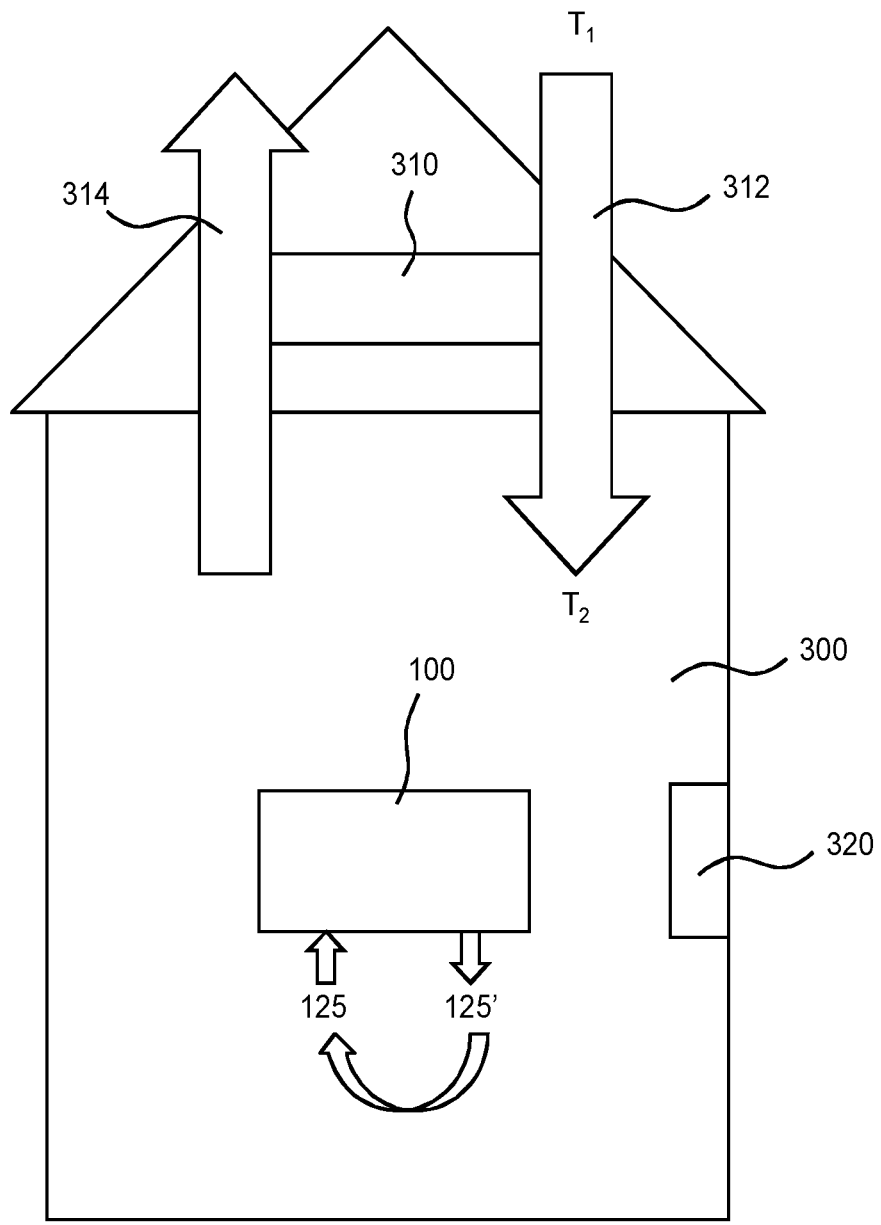
FIG. 5 depicts the use of an air purification system in a dwelling.

This is explained in more detail with the aid of FIG. 5, which schematically depicts a confined space, i.e. a building 300, including a climate control system 310 including an air inlet 312 for drawing air at a first temperature $T_1$ from outside the building 300 and providing the drawn air internally to the building 300 after thermal treatment of the drawn air to change its temperature from a first temperature $T_1$ to a second temperature $T_2$. The climate control system 310 may further comprise an air outlet 314 to expel air from the building 300. This for instance may be necessary to ensure that $CO_2$ levels within the building 300 do not exceed acceptable levels from a health perspective, i.e. to maintain $CO_2$ levels within a defined range of values. An additional heater or cooling unit 320 optionally may be present within the building 300.

In an embodiment, the climate control system 310 may include a heat exchange unit for increasing the temperature of the air flow to be inserted into the building 300 via air inlet 312; i.e. T1<T2. Such a climate control system 310 may for instance be applied in cold climates where the climate control system 310 is used to heat the building 300.

In an alternative embodiment, the climate control system 310 may include an air conditioning unit for decreasing the temperature of the air flow to be inserted into the building 300 via air inlet 312; i.e. T1>T2. Such a climate control system 310 may for instance be applied in hot climates where the climate control system 310 is used to cool the building 300.

In the absence of the gas purification system 100, an average-sized house (floor area of about 140 m$^2$ and enclosed volume of about 500 m) needs to be provided with sufficient fresh air to maintain healthy $CO_2$ levels. The amount of fresh air required will depend on several factors, e.g. rate of $CO_2$ generation inside the house, $CO_2$ levels in the fresh air and so on. For instance, at least 1,800 m$^3$ of fresh air comprising 400 ppm $CO_2$ must be provided on a daily basis, e.g. through combined natural and forced ventilation, to ensure that a single person occupying the house is not exposed to $CO_2$ levels of 1,000 ppm and above.

As will be appreciated, a large amount of energy needs to be invested in order to ensure that the imported fresh air is brought to the desired temperature $T_2$. For instance, heating the imported fresh air from −20° C. to +20° C. will typically require at least 3 kWh of electricity if an electric heater is used for this purpose, or at least 1 kWh of electricity if a heat pump is used for this purpose that has a coefficient of performance of about 3, based on a power P for heating/cooling of 1.25 kJ/m$^3$K of air of a density D of 1.2-1.3 kg/m$^3$ and a heat capacity $C_p$ of 1 kJ/kgK (P=D*$C_p$). Cooling the imported fresh air from +35° C. to +20° C. will typically require at least 1 kWh of electricity if a heat pump is used for this purpose. In these calculations it has been assumed that 600 m$^3$ of air is refreshed by forced ventilation and that the house has an ACH (Air circulated per hour) of 0.1 per hour, which equates to 1200 m/day for a typical house. The above estimates are for the forced ventilation only and do not include the energy required to heat or cool air entering the house through natural ventilation. The climate control of the natural ventilation will require another 16 kWh/day (or 5.3 kWh/day if achieved with a heat pump).

It has been estimated that an energy saving of at least 20% can be expected if a gas purification system 100 is included in the setup. This is because the volume of air to be drawn in by the climate control system 310 can be significantly reduced, due to the fact that air does not need to be expelled from the building 300 to maintain healthy $CO_2$ levels therein. Instead, the $CO_2$ levels are maintained by the gas purification system 100 as previously explained. Consequently, the workload of the climate control system 310 can be significantly reduced due to the fact that the air inside the building 300 may be recirculated through the climate control system 310, which recirculated air typically has a temperature much closer to the target temperature $T_2$ than the outside air. In some embodiments, this even facilitates the scaling down of the capacity and size of the climate control system 310, thereby reducing installation costs.

Figure 6:
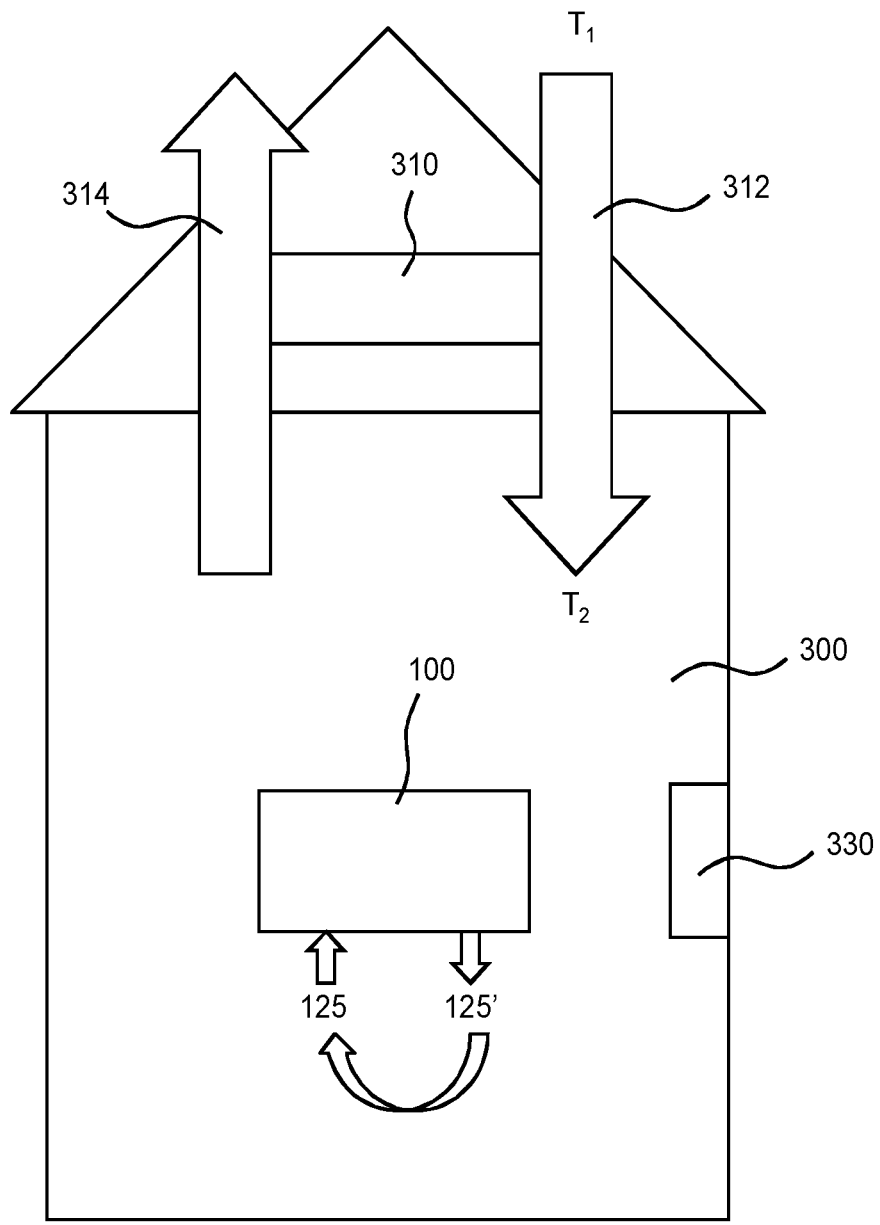
FIG. 6 depicts the use of an air purification system in a dwelling.

FIG. 6 schematically depicts another example use of the gas (air) purification system 100 in a building 300 further comprising a filter unit 330 for filtering contaminants such as dust and soot particles from contaminated outside air, e.g. for a building 300 located in a densely populated area such as a metropolis. Although such a filter may also be present in climate control system 310, the efficiency of such integrated filters is typically insufficient to achieve the desired levels of filtering. Such a filter unit 330 may be required to filter large amounts of outside air each day, e.g. 2,000 m³ or more in order to maintain healthy $CO_2$ levels within the building 300 as previously explained. As before, this may include natural ventilation. This requires a high-capacity filter and causes a high consumption of filter material. The inclusion of a gas purification system 100 according to an embodiment significantly reduces the amount of air that needs to be filtered by the filter unit 330, thereby reducing the required filter capacity and filter materials. Additional energy savings may be achieved if the filter unit 330 forms part of a climate control system 310 arranged to control the temperature of the inflowing air to be filtered as previously explained.

Figure 7:
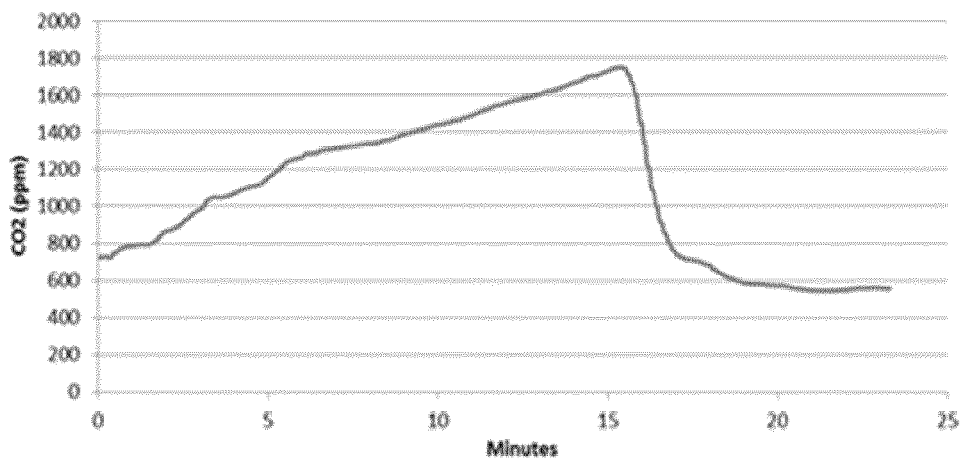
FIG. 7 is a graph depicting the development of the $CO_2$ level over time in a vehicle cabin in which an air conditioning unit is operational.

FIG. 7 depicts the $CO_2$ level inside a vehicle operating an air conditioning unit in recirculation mode to maintain the air inside the vehicle cabin at a controlled temperature. The vehicle is occupied by the driver only. As will be immediately apparent, a rapid increase in the $CO_2$ levels within the vehicle cabin is caused by the fact that the cabin air is recirculated in order to save energy. Within about 15 minutes, the $CO_2$ levels in the cabin are around 1,800 ppm, at which drowsiness can occur. This obviously compromises the safety of the driver of the vehicle and the safety of other road users. After 15 minutes, the recirculation mode of the air conditioning unit is switched off, leading to a rapid decrease of $CO_2$ levels due to the fact that outside air is imported into the vehicle, replacing the air with the increased $CO_2$ levels. However, this may have a negative impact on the fuel consumption of the vehicle as more energy may be required to bring the imported air to the required temperature. This is particularly relevant if the vehicle is at least in part propelled using electricity, e.g. hybrid and electric vehicles. Moreover, such outside air is typically polluted with different types of particles, which may therefore require the fitting of relatively large particle filters with high flow capacities to ensure a sufficient air flow through these filters in order to maintain $CO_2$ levels within desired ranges while maintaining high particle filter efficiency. This may encourage an occupant of the vehicle to operate the filter in recirculation or multi-pass mode, as this increases the filter efficiency as a function of the number of passes of the air through the filter.

Figure 8:
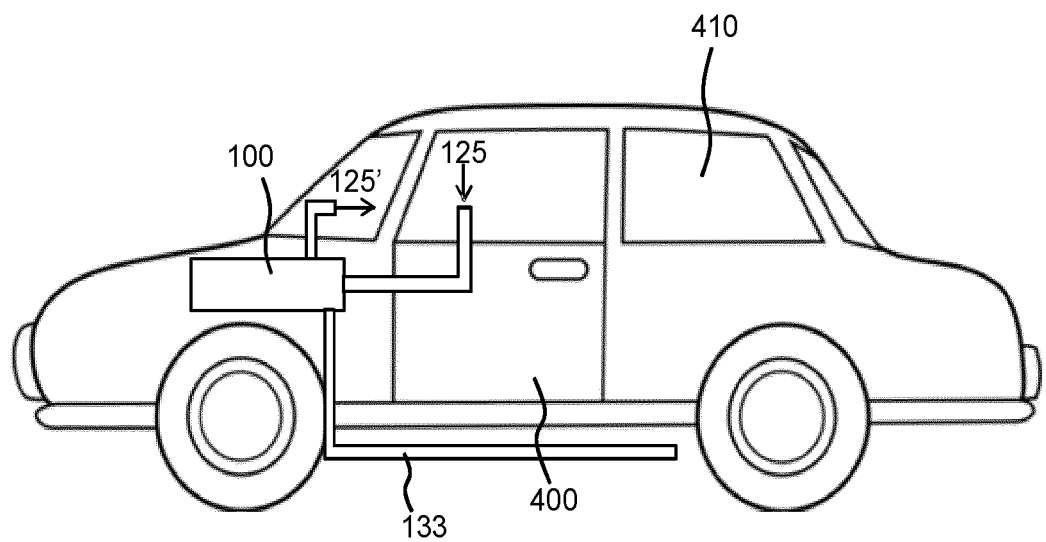
FIG. 8 depicts a vehicle including an air purification system including a $CO_2$ capture device.

FIG. 8 schematically depicts a vehicle 400 having a cabin 410 and including a gas purification system 100 according to an embodiment. The inclusion of the gas purification system 100 in the vehicle 400 reduces the need for outside air ventilation into the cabin 410, thereby facilitating a reduction in energy consumption and air filter dimensions. The gas purification system 100 is arranged such that air 125 is drawn from the cabin 410 into the exchange device 120 of the gas purification system 100, with the purified air 125' being returned from the exchange device 120 into the cabin 410. The gas outlet 133 of the regeneration device 130 may be arranged such that the captured $CO_2$ is vented outside the vehicle 400. In an embodiment, the aforementioned optional water-based filtration unit in front of the exchange device 120 may be incorporated in the air filter of the vehicle 400.

It has been demonstrated that the provision of a gas purification system 100 with an air capturing capacity of 85 m³/hour and a capturing efficiency of 70% is capable of maintaining $CO_2$ levels inside a cabin space of 5 m³ occupied by 2 adults well below 1,500 ppm with taking natural ventilation (ACH) of 0.5 per hour whereas in the absence of this gas purification system 100 the $CO_2$ levels increase to about 10,000 ppm in about 2.5 hours, thereby clearly demonstrating the benefits of the gas purification system 100 within the vehicle 400. It should be understood that the aforementioned capacity of the gas purification system 100 is a non-limiting example of such a capacity and that any suitable capacity gas purification system 100 may be employed.

In an embodiment, the gas purification system 100 has an air capturing capacity ranging from 50-50,000 m³/hour, preferably ranging from 50-10,000 m³/hour. Such ranges are particularly useful for a gas purification system 100 configured to operate in a domestic or a small to medium-size business setting.

The gas purification system 100 may further be used to enrich an atmosphere with the captured $CO_2$. In particular, the gas purification system 100 may be used to accelerate or otherwise control a photosynthesis process, in particular horticultural process such as a plant growth process in a city farming project, a greenhouse or any other confined space in which such a plant growth process takes place. At present, $CO_2$-enriched growing atmospheres are generated using expensive bottled $CO_2$ or industrial waste gases, but this is cumbersome and/or costly, for instance because such industrial complexes are often located at relatively large distances from the dwellings in which the plants are grown, which means that relatively long lengths of ducting are required to deliver the concentrated $CO_2$ at the desired location. In addition, industrial $CO_2$ typically has to be purified to remove contaminants from an industrial process such as from a power plant, thereby further adding to the cost of such $CO_2$. Consequently, there is a need for on-demand generation of $CO_2$-enriched air streams at or near such a desired location, for example for cost reasons.

Figure 9:
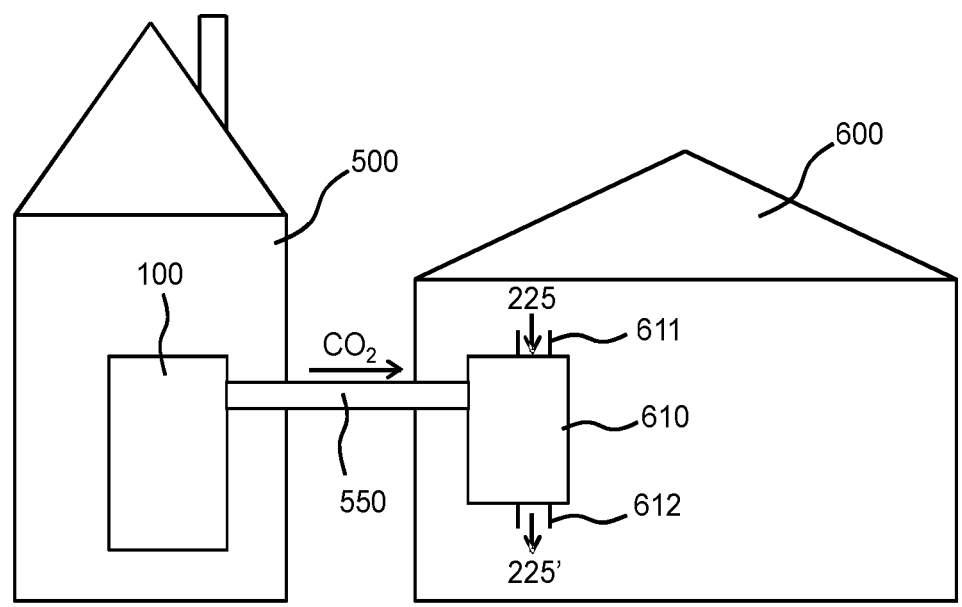
FIG. 9 depicts the use of a $CO_2$ enrichment system in a horticultural setting.

An example embodiment of such use is schematically depicted in FIG. 9. In this embodiment, the gas purification system 100 may be arranged to reduce $CO_2$ levels in a confined space such as a building 500, which may be any type of building to be occupied by one or more persons. By way of non-limiting example, the building 500 may for instance be a house such as a farmhouse occupied by the grower of the plants. In this embodiment, the gas purification system 100 is typically arranged to maintain the $CO_2$ level within the confined space within the range that is considered healthy to the occupants of the confined space, e.g. a level of below 1,000 ppm, 500 ppm, 400 ppm and so on. Alternatively, the gas purification system 100 may be arranged to extract $CO_2$ from the open air.

The gas purification system 100 is typically arranged to provide the captured $CO_2$, to a further confined space 600 in which photosynthesis processes take place, e.g. in which plants are grown. As is known per se, in such a photosynthesis process, $CO_2$ and water are converted into organic matter and oxygen under the influence of light of an appropriate wavelength. Therefore, such a process may be controlled, e.g. accelerated, by controlling the exposure of the plants to the appropriate amounts of $CO_2$, water and light. In an embodiment, gas purification system 100 is configured such that $CO_2$ levels within the further confined space 600 are maintained in the range from 1,000-2,000 ppm.

To this end, the gas purification system 100 is arranged to mix the captured $CO_2$ as released from the regeneration device 130 with a further air stream 225 to produce a $CO_2$-enriched air stream 225' for release into the further confined space 600, e.g. a greenhouse, in which the aforementioned photosynthesis processes take place. A further exchange device 610 may be in fluid communication with the further confined space 600, e.g. placed therein, which further exchange device 610 has an inlet 611 for receiving the further air stream 225 and an outlet 612 for providing the $CO_2$-enriched air stream 225' to the further confined space 600.

The further exchange device 610 is in fluid communication with the gas outlet 133 of the exchange device 130 of the gas purification system 100, e.g. via a conduit 550, for receiving the $CO_2$ extracted by the gas purification system 100. The further exchange device 610 may be directly coupled to the gas outlet 133 may alternatively be coupled to the storage tank 160 to facilitate increased control over the amount and rate of $CO_2$ to be released into the further confined space 600 as previously explained.

Figure 10:
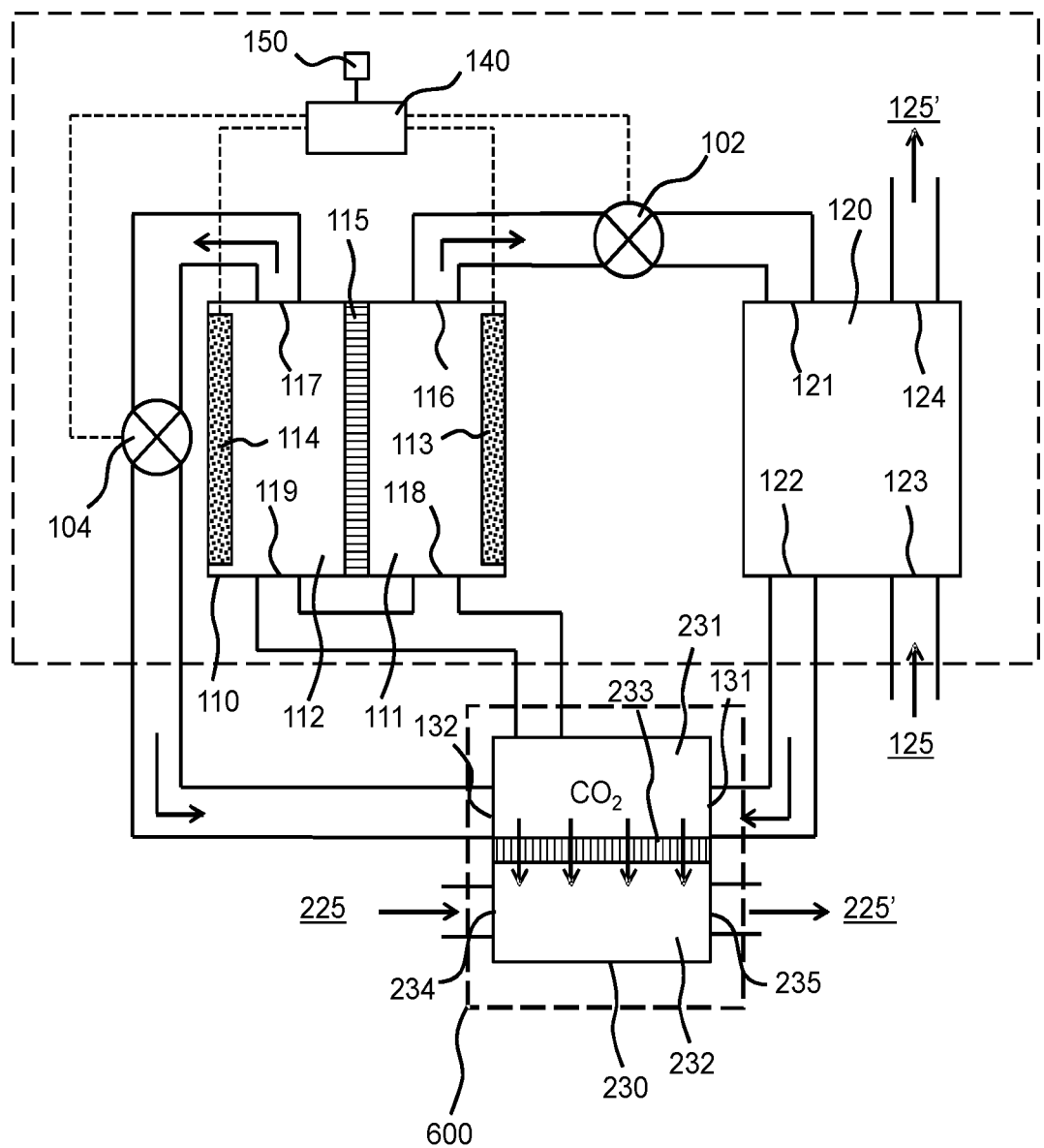
FIG. 10 depicts the use of a $CO_2$ enrichment system in a horticultural setting.

In an alternative embodiment, which is schematically shown in FIG. 10, the further exchange device 610 may be replaced by the further exchange device 230, which has been described in more detail with the aid of FIG. 3, in which case the $CO_2$-enriched further air stream 225' may be generated by directly contacting the further air stream 225 with the mixture of the capture fluid and the recombination fluid as previously explained. In FIG. 10, the further exchange device 230 is located in the further confined space 600 by way of non-limiting example only. It should be understood that the further exchange device 230 may be placed in any suitable location, as long as the $CO_2$-enriched further air stream 225' is released into the further confined space 600.

In the above embodiments of the use of the gas purification system 100 to enrich an atmosphere in which photosynthesis processes take place, the $CO_2$ enrichment rate of the further air stream 225 may be achieved in any suitable manner. For instance, the $CO_2$ capture rate achieved by the gas purification system 100 may be controlled by the voltage applied across the first electrode 113 and the second electrode 114 and/or the flow rate of the capture fluid and/or of the gas stream 125 through the exchange device 120. Alternatively or additionally, the flow rate of the further air flow 225 through the further exchange devices 230 or 610 as shown in FIG. 9 may be controlled to control the amount of $CO_2$ added to a unit volume of the further air flow 225. Alternatively or additionally, the amount of $CO_2$ released from the storage tank 160 and/or the frequency at which $CO_2$ is released from the storage tank 160 may be controlled to control the amount of $CO_2$ added to a unit volume of the further air flow 225. Other control mechanisms will be apparent to the person skilled in the art.

In the above embodiments of the gas purification system 100 and its respective uses, the electricity for operating the gas purification system 100 may be generated in a largely carbon-neutral manner, e.g. using renewable energy sources such as wind, solar or tidal power, thus further reducing the $CO_2$ footprint associated with the various aspects of the present invention.

Figure 11:
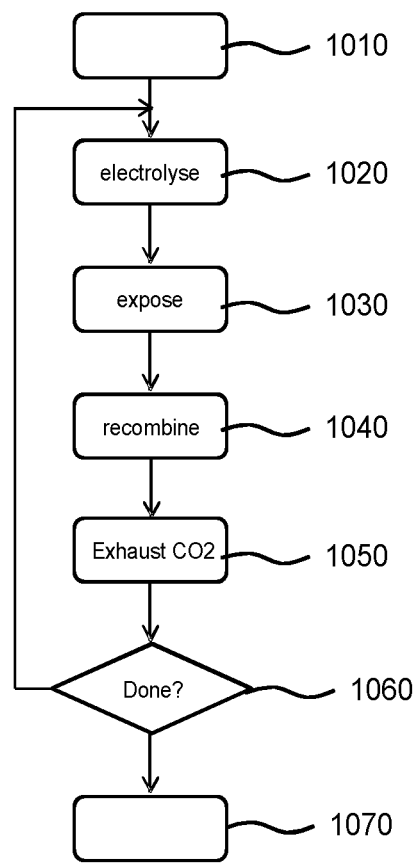
FIG. 11 is a flow chart of a target gas capturing method.

FIG. 11 depicts a flow chart of a method 1000 of capturing $CO_2$ from a gas such as a gas stream, e.g. an air stream. In step 1010, the method starts, e.g. by activating the gas purification system 100. This activation step may for instance include loading the system with a volume of water, which may comprise additives such as inert salts, freezing point-lowering agents and so on, as previously explained. The method proceeds to step 1020 in which the water is electrolyzed, e.g. in the electrolytic cell 100. This may for instance be achieved by providing a suitable voltage across the first electrode 113 and the second electrode 114. In the electrolysis step, a capture fluid comprising hydroxide ions and a recombination fluid comprising hydronium ions are formed and separated or kept separately.

In step 1030, the capture fluid is brought into contact with a gas such as a gas stream including $CO_2$. During this exposure, the $CO_2$ reacts with the hydroxide ions in the capture fluid, thereby transferring $CO_2$ from the gas into the capture fluid by forming dissolved $HCO_3^-$.

In step 1040, the capture fluid including the $CO_2$ bound to at least some of the hydroxide ions and the recombination fluid are combined, i.e. mixed, to release $CO_2$ and to recover water by recombining said hydronium and hydroxide ions. This recombination step 1040 may further include returning the recovered water to the electrolytic cell 110 for repeated electrolysis. The thus released $CO_2$ may be expelled from the mixture of the capture fluid and the recombination fluid in step 1050, e.g. vented into the open air. Alternatively, step 1030 may be performed on gas extracted from a first confined space and step 1050 may include the released $CO_2$ to be expelled into a second confined space, for instance to lower the $CO_2$ levels in the first confined space and to increase the $CO_2$ levels into the second confined space. This embodiment is for instance of particular relevance to the use of the gas purification system 100 in the control of a photosynthesis process, e.g. a horticultural or city farming process, as has been explained in detail with the aid of FIG. 9 and FIG. 10, in which case the second confined space may be a greenhouse or the like.

In step 1060 it is checked if the process needs to be repeated. If this is the case, the method reverts back to step 1020; otherwise the method terminates in step 1070. At this point, it is noted that although the method 1000 is depicted as a series of discrete steps that are executed in sequence, it should be understood that these steps may be executed in parallel, as the method 1000 may implement a continuous $CO_2$-capturing process in which a continuous flow of the capture fluid and the recombination fluid is maintained.

Figure 12:
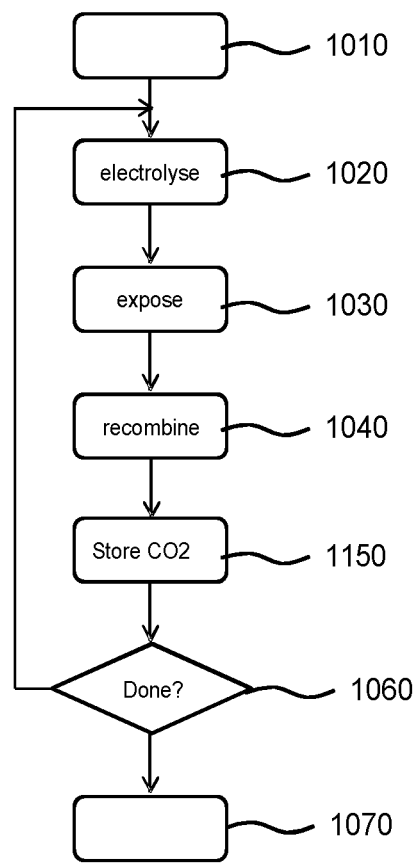
FIG. 12 is a flow chart of a target gas capturing method.

FIG. 12 depicts an alternative embodiment of the method 1000, in which step 1050 is replaced by step 1150 in which the $CO_2$ released from the mixture of the capture fluid and the recombination fluid is captured and stored, for instance in a storage tank 160. Step 1150 for instance may be used to temporarily store the released $CO_2$, e.g. to concentrate the $CO_2$ such that the stored, e.g. concentrated $CO_2$ can be used on-demand, e.g. in a synthesis process using the $CO_2$ as a reagent or in the aforementioned plant growth use.

Figure 13:
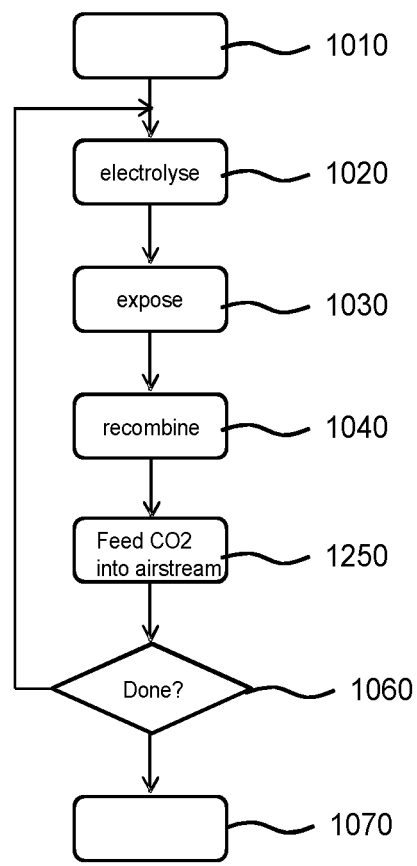
FIG. 13 is a flow chart of a target gas capturing method.

FIG. 13 depicts another alternative embodiment of the method 1000, in which step 1050 is replaced by step 1250 in which the $CO_2$ released from the mixture of the capture fluid and the recombination fluid is directly fed into another gas stream, e.g. another air stream. To this end, step 1250 may further comprise bringing the further gas stream into contact with the mixture of the capture fluid and the recombination fluid, as for instance has been explained in more detail with the aid of FIG. 3. As previously explained, this embodiment for instance is particularly suitable for enriching a further gas stream, e.g. a further air stream for use in a plant growth process.

The device of the invention can be used in a device or appliance for carbonation of beverages (fizz). The device then can be designed and operate as described with regard to FIG. 2. In this case it includes a $CO_2$ gas storage tank 160 which is used to store the captured $CO_2$ at pressure high enough for carbonation of the beverages. This pressure can be and typically is higher than the pressure of $CO_2$ just after release in compartment 130. In this case a compressor for compressing the $CO_2$ released at the outlet 133 before providing it to storage container 160 through inlet 161 can be and is preferably installed (not shown in the FIG. 2). Gas compressors are known in the art. The stored $CO_2$ gas can be used for beverage carbonation through release valve 163.

In one example of this embodiment, the electrodes 113 and 114 can be made of TiPt metal and connected to the controller capable of delivering at least a variable and controllable 5 V of potential at an output of at least 1 A of current. The electrolysis cell can have a volume and inlets and outlets capable of sustaining 60 to 1 liter per hour flow rate of electrolyte (preferably water as explained herein before). Preferably the system and pump are designed such that a flow rate of 1 to 5 liter per hour can be maintained. A system flow pump can be employed for that as described herein before. The regeneration device can have a volume between 50 and 500 milliliter and preferably has 100 milliliter. The gas exchanger 120 can have a simple arrangement to lead an air stream through the alkaline liquid. A gas bubbling device or arrangement can be used for that. Such arrangements are known per se. The gas exchanger 120 can have a membrane for allowing air to leave the extracter. The exchanger can have a throughput of air in the range of 1-2 cubic meter per hour. The device can have an ion exchanger for removal of Calcium ions from the capture fluids. This allows filling of the device with tap water before use or during use if water leaks out (e.g. through evaporation by the gas exchanger. The ion exchanger can be located after the outlet 122 and before inlet 131. The device or appliance can have gas permeable membranes to allow removal of $O_2$ and/or $H_2$ gas created through electrolysis of water in the electrochemical cell 110.

The device is particularly advantageous (and as a consequence useful for in home use) as it does not need $CO_2$ replenishment with prefilled bottles, but rather extracts its $CO_2$ from the environment.

An exemplifying device described can e.g. be designed to capture 30 g (0.7 mol or ~15 liter gas) of $CO_2$ per day (useful for carbonation of 4-6 L of beverage/softdrink). This amounts to 1.25 g (30 millimol) $CO_2$ per hour. A compressor capable of compressing up to 7.5 bar would then require a 2 L storage tank. Lower compression to 1 bar would give the need for a 15 L storage tank. Those skillen in the art will know how to calculate such pressures and volumes from standard gas laws and therewith adapt the device to specific needs. In a device that relies for its $CO_2$ supply on air air (assumed to contain ~1000 ppm of $CO_2$), 1.3 cubic meter of per hour must be processed by the device to capture the 30 g per hour of $CO_2$. This implies that for a 25 centimeter squared air inlet 123 an air flow 125 to 125' with a flow rate of 0.15 m/second must be maintained. An air pump capable of generating such streams can be used and these are known pers. At the same time a capture fluid flow (assumed to be water in the system) of 1 liters per hour would then be needed for a capture fluid pH of 12.5 in order to capture the 30 g of $CO_2$ per hour in the capture fluid. This is based on the amount of 30 millimol $HCO_3^-$ ions per liter. For comparison 0.4 g (10 millimol) $CO_2$ per hour at 1 liter per hour would require a capture fluid of pH 12. And a fluid with pH of 11 would need a flow of 60 liters per hour of capture fluid for the 1.25 g of $CO_2$ per hour. This in turn requires that the electrolysis cell be designed such that it can generate the desired capture fluid. The electrodes and volume of the cell must then be adjusted to be able to form at least the 30 mmol of $HCO_3^-$ ions per hour. A current of 1 A can do this.

In order to demonstrate proof of concept, a demonstrator gas purification system was built. The demonstrator consisted of an electrochemical cell, exchange device and regeneration device connected to a 10 L sealed vessel acting as a gas source. The electrochemical cell consisted of two mixed metal oxide (MMO) coated Ti electrodes of 10 cm×10 cm and a Mustang Q™ membrane separating the two electrodes. Mustang Q™ membrane is an anion exchanger with a polyethersulfone (PES) base modified with quaternary amines and can be obtained from: Pall Corporation. The exchange device was a polymer column filled with glass beads. At the bottom and the top of the column, a metal grid and a porous spacer were added to keep the glass beads in place.

The electrolyte contained ~10 mM $K_2SO_4$ in water. The air flow 125 was pumped from the vessel to the exchange device, the purified airflow 125' being recirculated into the vessel after filtration. At the beginning of the measurement, the concentration of $CO_2$ in the sealed vessel was brought up to a level of approximately 1% v/v.

The cell of the demo setup thus has 100 $cm^2$ electrode areas, ~10 mM $K_2SO_4$ as the electrolyte salt, and is able to generate ~1 L/hour (0.017 L/min) of the pH=11 liquid electrolyte.

Figure 14:
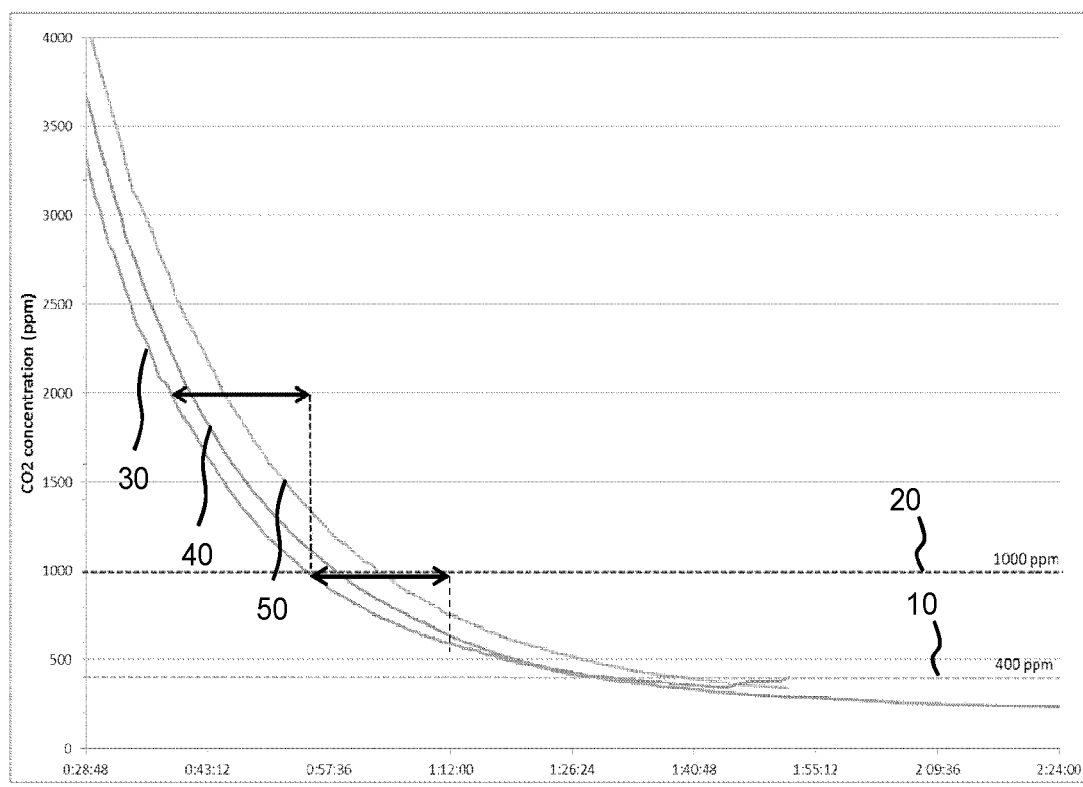
FIG. 14 is a graph depicting the ability of the capturing device to reduce $CO_2$ levels.

FIG. 14 depicts the results achieved with this demonstrator system. This clearly demonstrates that the demonstrator was able to rapidly reduce the initial $CO_2$ levels of around 10,000 ppm in the sealed vessel containing the enriched $CO_2$ atmosphere to around normal atmospheric levels of around 400 ppm as indicated by dashed line 10. Curve 30 corresponds to a high airflow container used in the demonstrator setup; curve 40 corresponds to a strong vortex container used in the demonstrator setup and curve 50 corresponds to a low airflow container used in the demonstrator setup. As can be seen, the type of airflow container only has a marginal impact on the performance of the demonstrator setup. It was found that for each embodiment of the demonstrator setup, the initial $CO_2$ levels were halved by each full circulation of the water volume through the demonstrator setup. This clearly demonstrates the effectiveness of the present invention.

Figure 15:
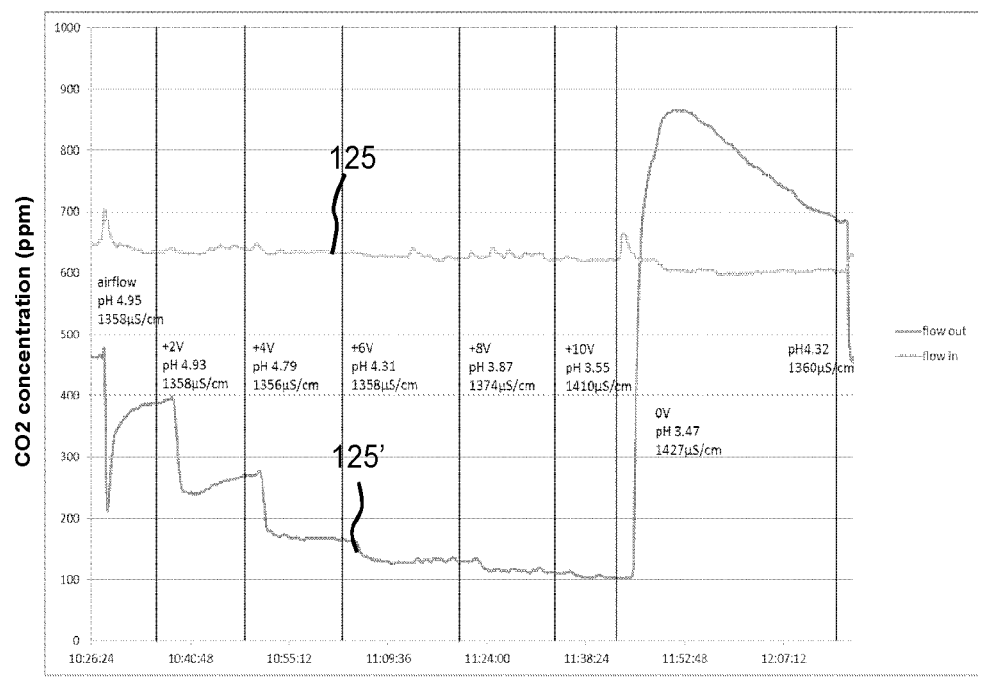
FIG. 15 is a graph depicting the $CO_2$ capturing ability as a function of the applied voltage for an example capturing device.

Next, it was demonstrated that the rate of $CO_2$ extraction can be controlled by the voltage applied across the electrodes of the electrolytic cell. This is shown in FIG. 15, which depicts the $CO_2$ content in an air flow 125 and a purified air flow 125' respectively, in which the voltage applied across the electrodes of the electrolytic cell is incrementally increased every 15 minutes by increments of 2V.

The demonstrator as described above but without the sealed vessel was placed in a fume hood in the lab. The intake of the air flow 125 was taken from near the front of the fume hood, ensuring a continuous flow of fresh air to the demonstrator. A small air pump was placed in this position to create the air flow 125 into the exchange device. Two identical $CO_2$ sensors were added to the demonstrator for this example. The intake sensor was placed next to the air pump to determine the $CO_2$ concentration of the air flow 125. A second sensor was attached to the further outlet 124 to determine the $CO_2$ concentration in the purified air flow 125'. As can be seen in FIG. 15, each voltage increment caused a further reduction in the $CO_2$ content of the purified air stream 125', thereby clearly indicating an improved $CO_2$ extraction efficiency by the demonstrator setup, as the $CO_2$ content in the inlet air stream 125 was substantially constant.

After operating the electrolytic cell at +10V for about 5 minutes, the voltage was switched off, which caused the $CO_2$ levels in the purified air stream 125' to rapidly increase. This experiment therefore clearly demonstrates that the $CO_2$ extraction efficiency of the gas purification system 100 may be regulated by the voltage applied across the electrodes of the electrolytic cell 110 of the gas purification system 100.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

In summary the invention provides a capture device for capturing a target gas from a gas flow is disclosed that can be continuously used without requiring consumption of target gas binding salts. To this end, the device is arranged to generate separate acidic and alkaline streams of fluid by electrolyzing water, binding the target gas to the hydroxide ions in the alkaline fluid stream and recombining the generated streams to release the bound target gas and regenerating part of the electrolyzed water for further electrolysis. Such a capture device may for instance be used in a gas purification system (100), e.g. an air purification system for controlling target gas levels in a confined space such as a vehicle cabin (410), domestic dwelling or office space, a target gas generation system or a target gas enrichment system, e.g. for creating target gas-rich air for horticultural purposes. A method (1000) for capturing target gas from a gas flow and optionally utilizing the captured target gas is also disclosed.

The invention claimed is:

1. An apparatus for capturing a target gas from a substrate, the apparatus comprising:
a generation device for electrolyzing water to generate hydronium ions and hydroxide ions, comprising:
a container for containing at least one electrolyte comprising water;
a first compartment fluidically coupled to the container and including a first electrode adapted to generate a capture fluid by electrolysis of the water of the at least one electrolyte, the capture fluid being acidic and comprising hydronium ions or being basic and comprising hydroxide ions, the first compartment comprising a capture fluid outlet;
a second compartment fluidically coupled to the container and including a second electrode adapted to generate a regeneration fluid by electrolysis of the water of the at least one electrolyte, the regeneration fluid being acidic and comprising hydronium ions if the capture fluid is basic or being basic and comprising hydroxide ions if the capture fluid is acidic, the second compartment comprising a recombination fluid outlet; and
an ion communication structure between the first compartment and the second compartment adapted to at least suppress recombination of hydronium ions and hydroxide ions, the generation device further comprising the generation device further comprising a first compartment inlet and a second compartment inlet fluidically coupled to the first compartment and the second compartment;
an exchange device comprising:
a capture fluid inlet fluidically coupled to the capture fluid outlet;
a substrate inlet; and
an exchange fluid outlet, wherein the exchange device is adapted to expose at least part of the capture fluid received through the capture fluid inlet to at least part of the substrate received through the substrate inlet thereby generating an exchange fluid consisting of the capture fluid in which at least part of the target gas is captured;
a regeneration device comprising:
an exchange fluid inlet fluidically coupled to the exchange fluid outlet, a recombination fluid inlet fluidically coupled to the recombination fluid outlet, and a regeneration fluid outlet fluidically couple to the first compartment inlet and the second compartment inlet, wherein the regeneration device is arranged to contact at least a part of the exchange fluid received through the exchange fluid inlet with at least part of the recombination fluid to release the captured target gas from the at least part of the exchange fluid and to generate a regeneration fluid including regenerated water from the at least one electrolyte; and
a controller electrically coupled to the first electrode and the second electrode, wherein the controller is adapted to generate a variable control signal having a minimum value sufficient to generate the water electrolysis at the first electrode and the second electrode respectively to control a rate of said water electrolysis.

2. The apparatus as claimed in claim 1, wherein the ion communication structure between the first compartment and the second compartment is an ion-selective membrane or a salt bridge.

3. The apparatus as claimed in claim 1, wherein the apparatus is configured to generate a flow of the capture fluid and/or the recombination fluid from 10 liter to 1,000 liter per hour.

4. The apparatus as claimed in claim 1, further comprising:
one or more pumps and/or valves to directly and/or indirectly control a flow rate of one or more of: the capture fluid, the recombination fluid, the exchange fluid, the regeneration fluid and the substrate, said one or more pumps and/or valves being controlled by the controller.

5. The apparatus as claimed in claim 1, further comprising one or more agitation devices for active stimulation of the contacting in the exchange device and/or active stimulation of the contacting in the regeneration device, the one or more agitation devices being controlled by the controller.

6. The apparatus as claimed in claim 5, wherein the controller is adapted to control one or more of the following controlling parameters:
the voltage and/or current provided to the electrodes for the electrolysis;

a mechanical configuration of the electrodes for the electrolysis;

operation of one or more pumps and/or valves to directly and/or indirectly control a flow rate of one or more of: the capture fluid, the recombination fluid, the exchange fluid, the regeneration fluid and the substrate; and operation of the one or more agitation devices for active stimulation of the contacting in the exchange device and/or active stimulation of the contacting in the regeneration device.

7. The apparatus as claimed in claim 1, wherein the apparatus comprises at least one sensor for sensing one or more of the following sensing parameters:

acidity of any one of: the one or more electrolytes, the capture fluid, the recombination fluid, the exchange fluid and the regeneration fluid;

flow rate of any one of: the one or more electrolytes, the capture fluid, the recombination fluid, the exchange fluid and the regeneration fluid, the substrate; and presence or concentration of the target gas in the substrate before contacting with the capture fluid and/or of the target gas in the part of the substrate that has been in contact with the capture fluid, wherein the controller is adapted to generate the control signal in response to a sensor reading from the at least one sensor.

8. The apparatus as claimed in 1, wherein the regeneration device comprises a target gas outlet for outflow of any captured target gas released from the exchange fluid as a consequence of the contacting in the regeneration device, wherein the target gas outlet can be coupled to a target gas storage tank.

9. The apparatus as claimed in claim 8, further comprising a storage tank fluidically connected the target gas outlet, and adapted to store the target gas.

10. The apparatus as claimed in claim 1, wherein the capture fluid is nebulized in the exchange device.

11. The apparatus as claimed in claim 1, wherein the controller is adapted to control pH of the capture fluid and recombination fluids, and fluid flow rates through the apparatus.

12. The apparatus as claimed in claim 1, the regeneration device comprising a first sub-compartment and a second sub-compartment separated by a gas-permeable or hydrophobic membrane for retaining a liquid fraction of the capture fluid and the recombination fluid within the first sub-compartment.

13. The apparatus as claimed in claim 12, wherein regeneration of water and release of the target gas takes place in the first sub-compartment.

14. A system comprising an apparatus as claimed in claim 1 and further including a target gas outlet and a confined space, wherein the substrate inlet is fluidically connected to the confined space and the target gas outlet is fluidically connected to at least another space different from the confined space, or wherein the target gas outlet is fluidically connected to the confined space and the substrate inlet is fluidically connected to at least another space different from the confined space.

15. The system as claimed in claim 14, wherein a further gas flow is brought into contact with a mixture of the capture fluid and the recombination fluid such that the target gas from the mixture can be directly transferred into the further gas flow to produce a target gas-enriched gas flow for release into the confined space.

16. The system of claim 15, wherein the further gas flow comprises air flow from the confined space.

17. An apparatus comprising:

a climate control system comprising an air inlet for drawing air at a first temperature ($T_1$) and providing the drawn air after thermal treatment of the drawn air to change its temperature from a first temperature ($T_1$) to a second temperature ($T_2$);

an air-purification system, configured to capture a target gas from a substrate, the air-purification system comprising:

a generation device for electrolyzing water to generate hydronium ions and hydroxide ions, comprising: a container for containing at least one electrolyte comprising water; a first compartment fluidically coupled to the container and including a first electrode adapted to generate a capture fluid by electrolysis of the water of the at least one electrolyte, the capture fluid being acidic and comprising hydronium ions or being basic and comprising hydroxide ions, the first compartment comprising a capture fluid outlet; a second compartment fluidically coupled to the container and including a second electrode adapted to generate a regeneration fluid by electrolysis of the water of the at least one electrolyte, the regeneration fluid being acidic and comprising hydronium ions if the capture fluid is basic or being basic and comprising hydroxide ions if the capture fluid is acidic, the second compartment comprising a recombination fluid outlet; and an ion communication structure between the first compartment and the second compartment adapted to at least suppress recombination of hydronium ions and hydroxide ions, the generation device further comprising the generation device further comprising a first compartment inlet and a second compartment inlet fluidically coupled to the first compartment and the second compartment;

an exchange device comprising:

a capture fluid inlet fluidically coupled to the capture fluid outlet;

a substrate inlet; and an exchange fluid outlet, wherein the exchange device is adapted to expose at least part of the capture fluid received through the capture fluid inlet to at least part of the substrate received through the substrate inlet thereby generating an exchange fluid consisting of the capture fluid in which at least part of the target gas is captured;

a regeneration device comprising:

an exchange fluid inlet fluidically coupled to the exchange fluid outlet, a recombination fluid inlet fluidically coupled to the recombination fluid outlet, and a regeneration fluid outlet fluidically couple to the first compartment inlet and the second compartment inlet, wherein the regeneration device is arranged to contact at least a part of the exchange fluid received through the exchange fluid inlet with at least part of the recombination fluid to release the captured target gas from the at least part of the exchange fluid and to generate a regeneration fluid including regenerated water from the at least one electrolyte; and a controller electrically coupled to the first electrode and the second electrode, wherein the controller is adapted to generate a variable control signal having a minimum value sufficient to generate the water electrolysis at the first electrode and the second electrode respectively to control a rate of said water electrolysis.

18. The apparatus as claimed in claim 17, wherein the ion communication structure between the first compartment and the second compartment is an ion-selective membrane or a salt bridge.

19. The apparatus as claimed in claim 17, further comprising:
one or more agitation devices for active stimulation of the contacting in the exchange device and/or active stimulation of the contacting in the regeneration device, the one or more agitation devices being controlled by the controller.

20. The apparatus as claimed in claim 19, wherein the controller is adapted to control one or more of the following controlling parameters:
the voltage and/or current provided to the electrodes for the electrolysis;
a mechanical configuration of the electrodes for the electrolysis;
operation of one or more pumps and/or valves to directly and/or indirectly control a flow rate of one or more of: the capture fluid, the recombination fluid, the exchange fluid, the regeneration fluid and the substrate; and
operation of the one or more agitation devices for active stimulation of the contacting in the exchange device and/or active stimulation of the contacting in the regeneration device.

21. The apparatus as claimed in claim 17, wherein the apparatus is configured to generate a flow of the capture fluid and/or the recombination fluid from 10 liter to 1,000 liter per hour.

22. The apparatus as claimed in claim 17, further comprising:
one or more pumps and/or valves to directly and/or indirectly control a flow rate of one or more of: the capture fluid, the recombination fluid, the exchange fluid, the regeneration fluid and the substrate, said one or more pumps and/or valves being controlled by the controller.

23. The apparatus as claimed in claim 17, wherein the apparatus comprises at least one sensor for sensing one or more of the following sensing parameters:
acidity of any one of: the one or more electrolytes, the capture fluid, the recombination fluid, the exchange fluid and the regeneration fluid;
flow rate of any one of: the one or more electrolytes, the capture fluid, the recombination fluid, the exchange fluid and the regeneration fluid, the substrate; and
presence or concentration of the target gas in the substrate before contacting with the capture fluid and/or of the target gas in the part of the substrate that has been in contact with the capture fluid,
wherein the controller is adapted to generate the control signal in response to a sensor reading from the at least one sensor.

24. The apparatus as claimed in 17, wherein the regeneration device comprises a target gas outlet for outflow of any captured target gas released from the exchange fluid as a consequence of the contacting in the regeneration device, wherein the target gas outlet can be coupled to a target gas storage tank.

25. A system comprising an apparatus as claimed in claim 17, further comprising a target gas outlet and a confined space, wherein the substrate inlet is fluidically connected to the confined space and the target gas outlet is fluidically connected to at least another space different from the confined space, or wherein the target gas outlet is fluidically connected to the confined space and the substrate inlet is fluidically connected to at least another space different from the confined space.

* * * * *